(12) United States Patent
Vankamamidi et al.

(10) Patent No.: US 12,182,448 B2
(45) Date of Patent: Dec. 31, 2024

(54) EXCLUSIVE OWNERSHIP OF LOGICAL ADDRESS SLICES AND ASSOCIATED METADATA

(71) Applicant: Dell Products L.P, Hopkinton, MA (US)

(72) Inventors: Vamsi K. Vankamamidi, Hopkinton, MA (US); Uri Shabi, Tel Mond (IL); Geng Han, Beijing (CN); Vladimir Shveidel, Pardes-Hana (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/134,881

(22) Filed: Apr. 14, 2023

(65) Prior Publication Data

US 2024/0345770 A1    Oct. 17, 2024

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/067* (2013.01)

(58) Field of Classification Search
CPC ..... G06F 3/0604; G06F 3/0607; G06F 3/0659
USPC ........................................................ 711/154
See application file for complete search history.

(56) References Cited

U.S. PATENT DOCUMENTS

2021/0357322 A1* 11/2021 Shveidel ............. G06F 12/0875

OTHER PUBLICATIONS

U.S. Appl. No. 17/137,988, filed Dec. 30, 2020, entitled Techniques for Workload Balancing Using Dynamic Path State Modifications, to Philippe Armangau, et al.

* cited by examiner

*Primary Examiner* — Mohamed M Gebril
(74) *Attorney, Agent, or Firm* — Muirhead and Saturnelli, LLC

(57) ABSTRACT

Logical address slices and corresponding metadata pages of mapping information can be partitioned into sets. Each node can be assigned exclusive ownership of one of the sets. In at least one embodiment, for a read I/O which is received at a first node and directed to a logical address LA1 that is owned by a second node, the first node can request that the second owning node perform resolution processing for LA1. The second node can own both LA1 and corresponding metadata pages included in mapping information used to map LA1 to a corresponding physical location PA1 including content C1 stored at LA1. The second node can perform resolution processing for LA1 using the metadata pages corresponding to LA1 to either read and return C1 to the first node, or obtain and return PA1 to the first node where the first node can then read C1 directly using PA1.

20 Claims, 19 Drawing Sheets

EXCLUSIVE OWNERSHIP OF LOGICAL ADDRESS SLICES AND ASSOCIATED METADATA

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: partitioning a logical address space into a plurality of slices where each of the plurality of slices corresponds to one of a first plurality of logical address subranges of the logical address space; forming a plurality of sets, wherein each of the plurality of sets includes a portion of the plurality of slices and includes corresponding metadata objects associated with the portion of slices included in said each set; assigning the plurality of sets to a plurality of nodes of a storage system, where each of the plurality of nodes is assigned a single one of the plurality of sets, wherein said each node exclusively owns slices and corresponding metadata objects of said single set assigned to said each node, and wherein said each node exclusively owns logical addresses of slices included in said single set assigned to said one node; receiving, from a host at a first of the plurality of nodes of the storage system, an I/O operation directed to a target logical address; determining whether the first node or a second of the plurality of nodes exclusively owns a first slice including the target logical address; responsive to determining the first node exclusively owns the first slice including the target logical address, the first node performing first processing to service the I/O operation; and responsive to determining that the second node owns the first slice including the target logical address, the first node performing second processing including: forwarding the I/O operation to the second node for servicing; receiving, at the first node from the second node, a reply regarding said forwarding; and responsive to receiving the response, the first node sending a second reply to the host regarding the I/O operation.

In at least one embodiment, the first node can exclusively own first slices and can exclusively own corresponding first metadata objects in a first of the plurality of sets, and wherein the second node can exclusively own second slices and can exclusive own corresponding second metadata objects in a second of the plurality of sets. The first set can include the first slices corresponding to first metadata leaf objects. The first set can include first metadata mid objects which point to or reference the first metadata leaf objects. The first set can include first metadata top objects which reference or point to the first metadata mid objects. the second set can include the second slices corresponding to second metadata leaf objects. The second set can include second metadata mid objects which point to or reference the second metadata leaf objects, and can include second metadata top objects which reference or point to the second metadata mid objects. The first metadata leaf objects, the first metadata mid objects, and the first metadata top objects can be used to map first logical addresses associated with the first slices to corresponding first physical storage locations including content stored at the first logical addresses. The second metadata leaf objects, the second metadata mid objects, and the second metadata top objects can be used to map second logical addresses associated with the second slices to corresponding second physical storage locations including content stored at the second logical addresses.

In at least one embodiment, only the first node can service I/Os directed to target logical addresses in the first slices exclusively owned by the first node; and wherein only the second node can service I/O directed to target logical addresses in the second slices exclusively owned by the second node. The I/O operation can be a read I/O operation requesting to read content C1 from the target logical address. The first node can own the target logical address and the first slice including the target logical address, and wherein the first metadata objects owned by the first node can include a metadata top object, a metadata mid object and a metadata leaf object each of which can be associated with the target logical address and each of which can be exclusively owned by the first node. First mapping information can be used in mapping the target logical address to a first storage location storing C1, and wherein the first mapping information can include the metadata top object, the metadata mid object and the metadata leaf object associated with the target logical address.

In at least one embodiment, the I/O operation can be a read I/O operation requesting to read content C1 from the target logical address, wherein the second node can owns the target logical address and the first slice including the target logical address. The second metadata objects owned by the second node can include a metadata top object, a metadata mid object and a metadata leaf object each of which can be associated with the target logical address and each of which can be exclusively owned by the second node. First mapping information can be used in mapping the target logical address to a first storage location storing C1, and wherein the first mapping information can include the metadata top object, the metadata mid object and the metadata leaf object associated with the target logical address.

In at least one embodiment, plurality of node can be two nodes, the first node and the second node. Processing can include: assigning a slice identifier (ID) to each of the plurality of slices, said slice ID uniquely identifying said each slice with respect to other of the plurality of slices, where each slice ID assigned to a corresponding one of the plurality of slices is an integer included in a sequence of consecutive increasing integers; forming a first slice set including only the first slices, where the first slices only include ones of the plurality of slices having an odd slice ID; and forming a second slice set including only the second slices, where the second slices only include ones of the plurality of slices having an even slice ID. Slices of the first slice set can be interleaved with slices of the second slice set in the logical address space. The first plurality of logical address subranges of the logical address space can be consecutive contiguous subranges of logical addresses. The slice IDs assigned to the plurality of slices can denote a relative position of the plurality of slices in the logical address space. An odd metadata hierarchical structure can include the first metadata objects and the odd metadata hierarchical structure can be exclusively owned by the first node, and wherein an even metadata hierarchical structure can includes the second metadata objects and the even metadata hierarchical structure can be exclusively owned by the second node.

In at least one embodiment, the first node can use the odd metadata hierarchical structure to map first logical addresses associated with the first slice set to corresponding physical storage locations including content stored at the first logical addresses, and wherein the second node can use the even metadata hierarchical structure to map second logical addresses associated with the second slice set to corresponding physical storage locations including content stored at the second logical addresses.

In at least one embodiment, processing can include: receiving a write I/O that writes content C1 to a second target logical address LA2, wherein LA2 is included in a target slice of the first slice set owned by the first node; recording the write I/O in a log; destaging, by the first node, the recorded write I/O from the log, wherein said destaging includes: updating second mapping information to map LA2 to a second physical storage location PA2 including C1, wherein the second mapping information includes a second plurality of metadata objects of the odd metadata hierarchical structure owned exclusively by the first node. Destaging can include allocating one or more of the second plurality of metadata objects used to map LA2 to PA2.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
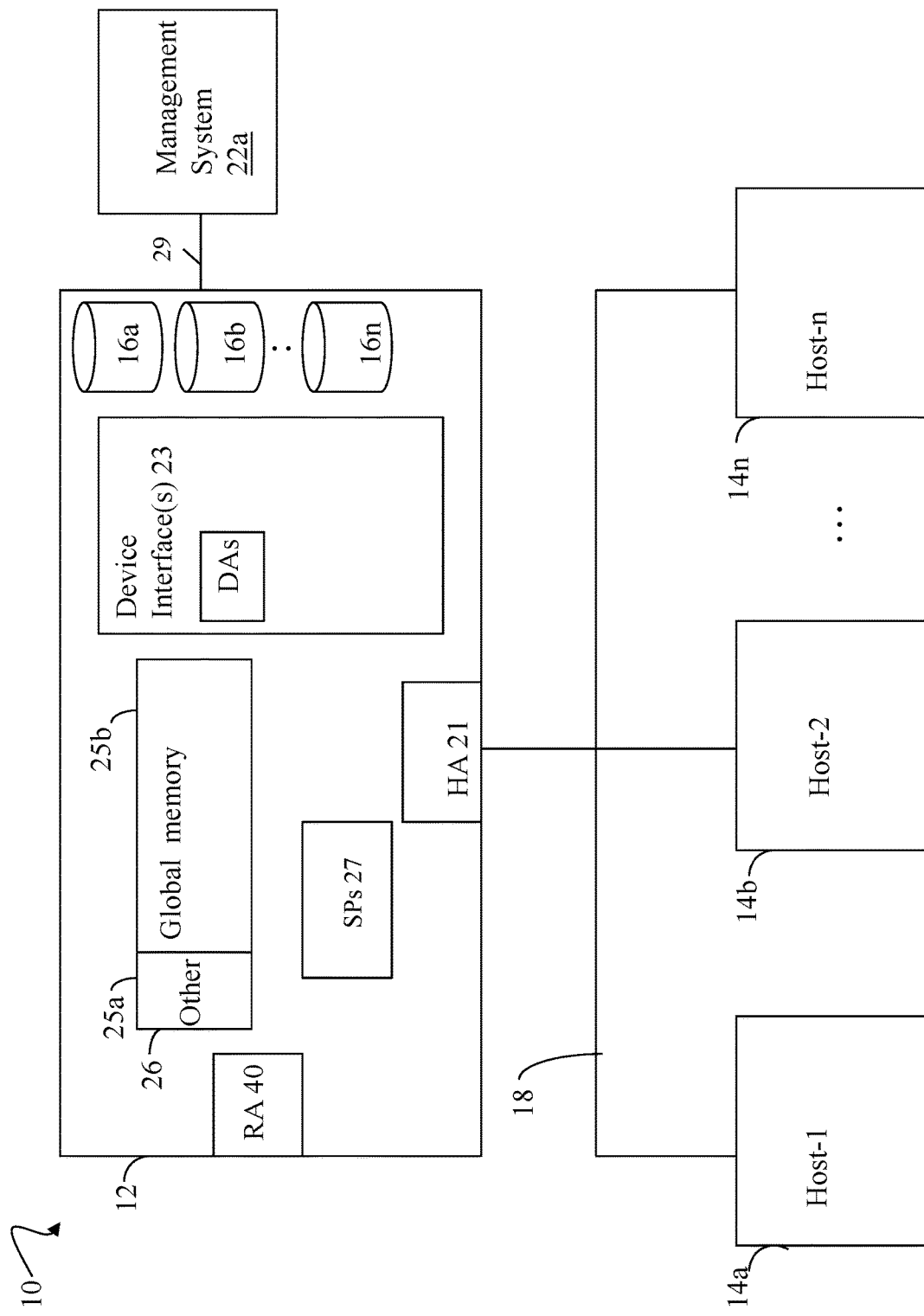
FIG. 1 is an example of components that may be included in a system in accordance with the techniques of the present disclosure.

Existing systems, such as data storage systems, can maintain and utilize a data cache to store frequently accessed pages of data. The data cache can be, for example, a form of fast volatile memory such as a volatile form of random access memory (RAM). In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from longer term backend (BE) non-volatile storage. A cache miss as compared to a cache hit results in an I/O performance penalty and increased I/O latency in order to service the read I/O and return the requested read data to the requester. The data cache can provide for read cache hits and optimized performance such as by providing for improved I/O latency and improved utilization of system resources. Generally, the data cache, and cache memory in general, can be characterized as a critical and expensive resource which can have a limited size or capacity. Accordingly, it is important for systems to utilize the data cache, and more generally cache storage, efficiently to provide for optimal performance.

In at least one existing system, mapping information can be used to map a logical address to a corresponding physical storage location or address storing the user data or content of the logical address. The mapping information can include a chain of metadata (MD) pages traversed to obtain the content of a logical address from its corresponding physical storage location or address on BE non-volatile storage. Thus, a read cache miss with respect to a read I/O requesting to read user data from a logical address can result in a cache miss with respect to the data cache noted above. Read cache miss processing can incur a performance penalty as noted above, at least in part, due to the traversal of the chain of MD pages of the mapping information. The MD pages of mapping information can also be stored on BE non-volatile storage. Thus, traversing the chain of MD page can include retrieving each MD page of the chain from BE non-volatile storage thereby incurring additional performance penalties to access. To further improve performance, a system can also store the mapping information, such as the chain of MD pages, in the cache. However, as with the user data and the limited size of the cache, not all mapping information or MD pages for all user data can be stored in the cache. As a result, accessing the multiple layers or levels of MD pages which can be needed for accessing the read data to service a read cache miss can result in additional cache misses thereby incurring an additional performance penalty to access any uncached MD pages of mapping information from BE non-volatile storage.

Some system can include multiple processing nodes where the multiple processing nodes can service I/Os. In such systems, cache usage can be even more inefficient across the multiple processing nodes since the same MD and/or user data or content for servicing I/Os can be cached in node-local caches of all the multiple processing nodes. For example, pages of the same user data and/or MD can be cached locally in caches of the multiple processing nodes.

To improve upon the foregoing in some aspects such as in block-storage systems, ownership at a per volume or per logical device level of granularity can utilized. Ownership of each volume can be assigned to a single node in a multi-node storage system. Such ownership can be exclusive where only the owning node of a volume can service I/Os directed to the volume. In a multi-pathing storage environment, the same volume V1 can be presented to, and accessed by, a host from multiple paths to multiple nodes A and B, where V1 can be owned by only a single node, such as only node A but not node B. In such systems, I/Os sent from the host and directed to V1 can be received by the non-owning node B. However, the non-owning node B can then redirect or forward the received I/Os directed to V1 to the owning node A for servicing. Such exclusive volume ownership by a single node can improve performance since caching of data, MD, and the like, can be localized to the owning node.

One drawback of requiring that only the owning node of a volume service I/Os of the volume relates to load balancing. For example, node A which owns V1 can service I/Os directed to V1 even in cases where node A is very busy or overloaded and where the non-owning node B can be idle or more generally be underutilized and have available bandwidth to service I/Os. In this manner, a load imbalance can occur between the nodes A and B where only the overloaded owning node A can be allowed to service I/Os directed to one or more volumes, such as V1, owned by node A.

A storage system can implement per volume ownership using different solutions that can vary with the particular protocol and standards used. A storage system can implement a SCSI-based solution and operate in accordance with the SCSI Asymmetrical Logical Unit Access (ALUA) standard. The ALUA standard specifies a mechanism for asymmetric or symmetric access of a volume, logical unit or LUN as used herein. ALUA allows the data storage system to set a volume's access state with respect to a particular initiator port and the target port. Thus, in accordance with the ALUA standard, various access states may be associated with a path with respect to a particular volume or logical device. The ALUA path states for a volume such as V1 can be specified to notify the host to use paths to an owning node A rather than other paths to the non-owning node B when the host sends I/Os directed to V1 to the storage system. One disadvantage associated with an ALUA-based solution such as the foregoing relates to load balancing as noted above.

Another disadvantage associated with ALUA can be related to ease of use. With ALUA, it can be the responsibility of the storage administrator to carefully determine which volumes are bound or owned by each of the nodes in the storage system in order to achieve a desired load balance. Such a determination can be a difficult task.

Rather than rely on the storage system administer to perform a load balancing assessment and assign or reassign volume ownership among the nodes, a dynamic ALUA-based solution can be implemented. With the dynamic ALUA-based solution in at least one implementation, the storage system can automatically detect a load imbalance between the multiple nodes of the system. In response, the storage system can automatically take a responsive action to repartition and/or move volume ownership of one or more volumes between the multiple nodes to alleviate or reduce the node-level load imbalance. The storage system can thus automatically modify ALUA path states to the different nodes to implement volume ownership changes. However, ALUA-based solutions in general can operate at a large or coarse level of granularity of control, both time-wise and address-space wise (e.g., with its per volume level of ownership). In such ALUA-based solutions, processing can typically evaluate whether there is an imbalance and take a responsive action at a periodic time interval, such as every half hour, which can be larger than desired. Thus it can be desirable to provide for a smaller or finer granularity of control time-wise and/or address-space wise (e.g., smaller than a single volume).

As noted above, an alternative is to have multiple nodes service I/Os directed to a single volume rather than the single owning node. However, as also noted above, having multiple nodes service I/Os directed to the same single volume to address load imbalance can result in adverse performance, caching inefficiencies, and the like, due to shared access of stored content, metadata, and the like.

To further improve upon the foregoing, an architecture can be utilized which partitions ownership of sub-volume portions or slices of the logical address space of user data or content among the multiple processing nodes. In one such architecture, a node assigned a particular logical address slice can be designated as the exclusive owner of the logical address slice. Each such slice can corresponding to a sub-volume logical address space portion such that the logical address space of a single volume can be generally partitioned into two or more slices. A node can service I/Os directed to logical address slices (sometimes simply referred to herein as slices) owned by the node. In at least one embodiment, if the node receives an I/O directed to a logical address in a slice not owned by the node, the receiving node can forward the I/O for servicing or processing to the owning node of the slice (and thus owner of the logical address included in the slice's logical address space sub-range). Generally, an exclusive ownership assignment can also be characterized as a strong ownership. In contrast, a non-exclusive ownership assignment can also be characterized as a weak ownership. With such sub-volume slice exclusive ownership, even if only a single volume is busy, multiple nodes (each owning different slices of the busy single volume) can be involved in servicing the busy volume's I/Os rather than a single node. However, even with such per slice exclusive ownership of user data logical address space, locality of access can still partially be a problem. In particular, portions of MD can still be shared by the multiple nodes even though each such node may only service I/Os directed to corresponding logical address slices owned by each such node. In this manner, any such shared MD pages can be cached in multiple local caches of multiple nodes. For example, the mapping information of MD pages can be included in a multi-level hierarchy of MD pages forming a tree-like data structure. In this case, each of the lower level MD leaf pages can correspond to a logical address space subrange or portion R1 exclusively owned by one of the nodes. However, upper levels of the hierarchy or tree can include non-leaf MD pages, where each such non-leaf MD page can correspond to a larger logical address space subrange or portion R2. R2 can be much larger than R1, and R2 can correspond to or include multiple R1s or multiple MD leaf page logical address subranges. In such a system, a non-MD leaf page corresponding to an R2 logical address space portion can be used and thus cached by multiple different nodes each owning one of the R1 logical address subranges included within R2.

Accordingly, described in the present disclosure are techniques that overcome the foregoing drawbacks and provide for improved and efficient cache usage, and also improvements in performance. In at least one embodiment, the techniques provide for achieving locality of access for all levels of the MD pages of a mapping information structure or hierarchy. Such mapping information can be used to map logical addresses to corresponding non-volatile physical storage locations containing content stored at such logical addresses.

In at least one embodiment, an architecture can be utilized which partitions ownership of a logical address space of user data or content among the multiple processing nodes of the storage system. For example, the logical address space can correspond to one or more volumes, or more generally, one or more storage objects. The storage objects can include logical devices or volumes, files, file systems, directories, and/or sub-portions of such storage objects.

In at least one embodiment, a node assigned a particular logical address, or a subrange of logical addresses, can be designated as the exclusive owner of the logical address or subrange. If the node receives an I/O directed to a logical address not owned by the node, the receiving node can forward or redirect the I/O for servicing or processing to the owning node. In at least one embodiment, the non-owning node can redirect the I/O to the owning node over an interconnect used for internode communication. The interconnect can be internal to the storage system of multiple nodes. The foregoing I/O forwarding from the non-owning to the owning node can be performed transparently with respect to the external host which issued the I/O to the non-owning node. Once the owning node has serviced the I/O, the owning node can send a reply or response to the non-owning node which received the I/O. In response, the non-owning node can send a response or reply regarding completion of the I/O to the host that originated or issued the I/O. In at least one embodiment using ALUA, ALUA path states can be appropriately set to notify the host to send I/Os directed to a volume over the volume's preferred paths to an owning node rather than non-preferred paths to a non-owning node. The host can perform intelligent multipathing which can select to send I/Os to the volume over the preferred paths to the owning node rather than the non-preferred paths to the non-owning node.

In at least one embodiment, the logical address space can be partitioned or divided into slices where each slice corresponds to a sub-volume logical address portion. In this manner, a volume or logical device, or more generally a storage object, can have an associated logical address space which is partitioned into multiple slices. Each such slice can be assigned to a single one of the nodes as the slice's exclusive owner thereby providing a strong ownership of slices to particular nodes.

The architecture can also assign strong ownership to MD pages included in the mapping information. The MD pages can be included in the hierarchical structure, such as a tree, of MD pages where the structure has multiple levels. Strong ownership of a MD page assigned to a node can denote exclusive ownership of the assigned MD page by the node. In at least one embodiment, the techniques of the present disclosure provide for assigning ownership of the MD pages of mapping information among the multiple nodes of the system. In at least one embodiment, the MD pages of mapping information can be partitioned into multiple sets, where exclusive ownership of one of the multiple sets of MD pages can then be assigned to a corresponding one of the multiple nodes. In at least one embodiment, exclusive ownership of each MD page can be assigned to a single one of the nodes.

In at least one embodiment, the particular MD pages exclusively owned by a node can correspond to the particular slices of logical address space subranges also exclusively owned by the node. In this manner, the node which exclusively owns a slice can also exclusively own the corresponding MD pages needed to map logical addresses of the slice to physical addresses or locations containing content stored at such slice-level logical addresses.

In at least one embodiment, the mapping information can include a multi-level tree of MD pages. In at least one embodiment, the number of levels in the tree can be three or more. In at least one embodiment, the tree can be a B+ tree data structure where each non-leaf node can include up to N children. Thus N can be a specified maximum allowable number of child nodes and N can be 2 or more.

In at least one embodiment in which the mapping information includes a 3 level tree of MD pages, each slice, which is exclusively owned by one of the nodes, can correspond to a logical address space subrange associated with a MD leaf page of the tree. The tree can also include a mid MD page level of mid MD pages and a top MD page level of top MD pages. Each mid MD page can include addresses of, or pointers to, MD leaf pages. Each top MD page can include addresses of, or pointers to, MD mid pages. To achieve desired locality of reference for MD top and mid pages, the techniques of the present disclosure can include interleaving slice ownership among the multiple nodes of the storage system. Such interleaving can include interleaving consecutive slices of contiguous logical address subranges among the multiple nodes. Such interleaving can include interleaving pointers or addresses of the MD pages to achieve exclusive ownership of MD top and MD mid pages. In at least one embodiment, the mapping information of MD pages can include multiple trees or hierarchical structures where each such tree or structure can be exclusively owned by a single one of the multiple nodes in the system.

In at least one embodiment, the storage system can include two nodes and a logical address space can be partitioned into two sets of slices, where each slice set is exclusively owned by a different one of the nodes. The logical address space can be partitioned into consecutive slices which correspond to consecutive, contiguous sequential logical address subranges of the logical address space. The slices can be assigned a unique integer identifier or ID such as beginning with one (1), where even slices can be included a first slice set owned by node A, and where odd slices can be included in a second slice set owned by node B. Each slice can correspond to a logical address subrange size such as 2 MBs. In at least one embodiment, each MD page of the tree of mapping information can include 512 entries, where each entry is a pointer or address. Each non-leaf MD page entry can be a pointer to, or address of, another MD page. Each leaf MD page entry can be a pointer to, or address of, an entry in a VLB (virtual layer block) page. In such an embodiment where each MD leaf corresponds to a 2 MB logical address space portion, each MD leaf entry can correspond to a 4K page of content or stored user data. Each MD leaf entry can include the address of a VLB entry, where the VLB entry further includes another pointer to or address of non-volatile storage containing the content or user data. In such an embodiment with two nodes where each MD leaf corresponds to a 2 MB slice and where each of the two nodes is assigned exclusive ownership of either all odd slices or all even slices, each MD mid page can correspond to a 2 GB logical address range where the MD mid page can include entries for either only odd slices (e.g., odd MD leaves), or only even slices (e.g., even MD leaves). A first node A assigned exclusive ownership of even slices can be assigned exclusive ownership of one or more mid MD pages each including entries with pointers to or addresses for only even slices or even MD leaves. A second node B assigned exclusive ownership of odd slices can be assigned exclusive ownership of one or more mid MD pages each including entries with pointers to or addresses for only odd slices or odd MD leaves. Thus, each mid MD page can correspond to a 2 GB address range but include associated mapping information for only even slices corresponding to even MD leaves, or only odd slices corresponding to odd MD leaves. Thus, each MD mid page can include addresses or pointers for 1 GB worth of logical addresses which alternate slices within the 2 GB range associated with the MD mid page. In one such embodiment, each MD mid page can include 512 pointers each to a different MD leaf. In at least one embodiment, each MD top page can correspond to a 1 TB address range but include associated mapping information for mid MD pages only associated with even slices (e.g., even MD leaf pages) or only associated with odd slices (e.g., odd MD leaf pages). Each MD top page can include pointers for ½ TB worth of logical addresses which alternate slices within the 1 TB range associated with the MD top page. In one such embodiment, each MD top can include 512 pointers each to a MD mid page. In this manner, MD leaf, mid and top pages corresponding to only even slices or even MD leaf pages can be exclusively owned by node A; and MD leaf, mid and top pages corresponding to only odd slices or odd MD leaf pages can be exclusive owned by node B. Generally, a MD top or mid page which includes only pointers to odd MD leaf pages can sometimes be referred to herein as an odd MD page; and a MD top or mid page which includes only pointers to even MD leaf pages can sometimes be referred to herein as an even MD page. In at least one embodiment with two nodes, the mapping information of MD pages can include two trees or hierarchical structures where each such tree or structure can be exclusively owned by one of the two nodes in the system. In one such embodiment with two nodes, a first hierarchical structure can be designated as an odd structure or tree including only MD pages associated with odd MD leaf pages; and a second hierarchical structure can be designated as an even structure or tree including only MD pages associated with even MD leaf pages; and where the odd structure can be exclusively owned by one of the nodes and the even structure can be exclusively owned by the second remaining node.

The forgoing can more generally be extended to an embodiment in accordance with the techniques of this disclosure where the storage system includes N nodes, where N can be equal to or greater than two. In this case, the MD leaves can generally be partitioned into N slices sets where each of the N slices sets can be exclusively owned by a different one of the N nodes. In at least one embodiment where each MD leaf, mid and top page can also include 512 entries and each MD leaf corresponds to a 2 MB slice, each MD mid and top page can now correspond to a logical address range which increases in accordance with N. For example, if N=4, the slices or MD leaves corresponding to the consecutive contiguous 2 MB logical address subranges can be assigned consecutive sequential unique IDs and then partitioned into 4 slice sets. Slice set 1 can include slices with every $4^{th}$ slice ID beginning with 1, 5, 9, 13, and so on, where slice set 1 can be assigned to node A. Slice set 2 can include slices with every $4^{th}$ slice ID beginning with 2, 6, 10, 14, and so on, where slice set 2 can be assigned to node B. Slice set 3 can include slices with every $4^{th}$ slice ID beginning with 3, 7, 11, 15, and so on, where slice set 3 can be assigned to node C. Slice set 4 can include slices with every $4^{th}$ slice ID beginning with 4, 8, 12, 16, and so on, where slice set 4 can be assigned to node D. If N=4, each MD mid page can correspond to a 4 GB range and each MD mid page can include entries corresponding to every $4^{th}$ MD leaf within the 4 GB range. In a similar manner, if N=4, each MD top page can correspond to a 2 TB range and each MD top page can include entries corresponding to MD mid pages with entries for every $4^{th}$ MD leaf. In one such embodiment with N nodes, there can be N trees or hierarchical structures of MD objects. Each of the N trees or structures can include MD leaf pages or objects of only a single one of the N slice sets. Each of the N trees or structures can be exclusively owned by a single one of the N nodes which can service I/Os directed to logical addresses of slices owned by the single one of the N nodes.

In at least one embodiment, a node which receives an I/O operation can be referred to as the initiator node with respect to that particular I/O operation.

In at least one embodiment, exclusive ownership of a slice or portion of logical addresses as well as associated MD pages can be assigned to the same single node. The foregoing exclusively owned associated MD pages for an owned slice can be used to map the logical addresses of the slice to corresponding non-volatile storage locations containing content stored at such logical addresses. In one aspect, the exclusively owned slice and associated MD pages can denote strong ownership or include the exclusive locking by a owning particular node, where such ownership may not be shared with another node. In at least one embodiment, a storage node assigned exclusive ownership over a logical address or a MD portion may not yield access to that logical address or MD portion to another node.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
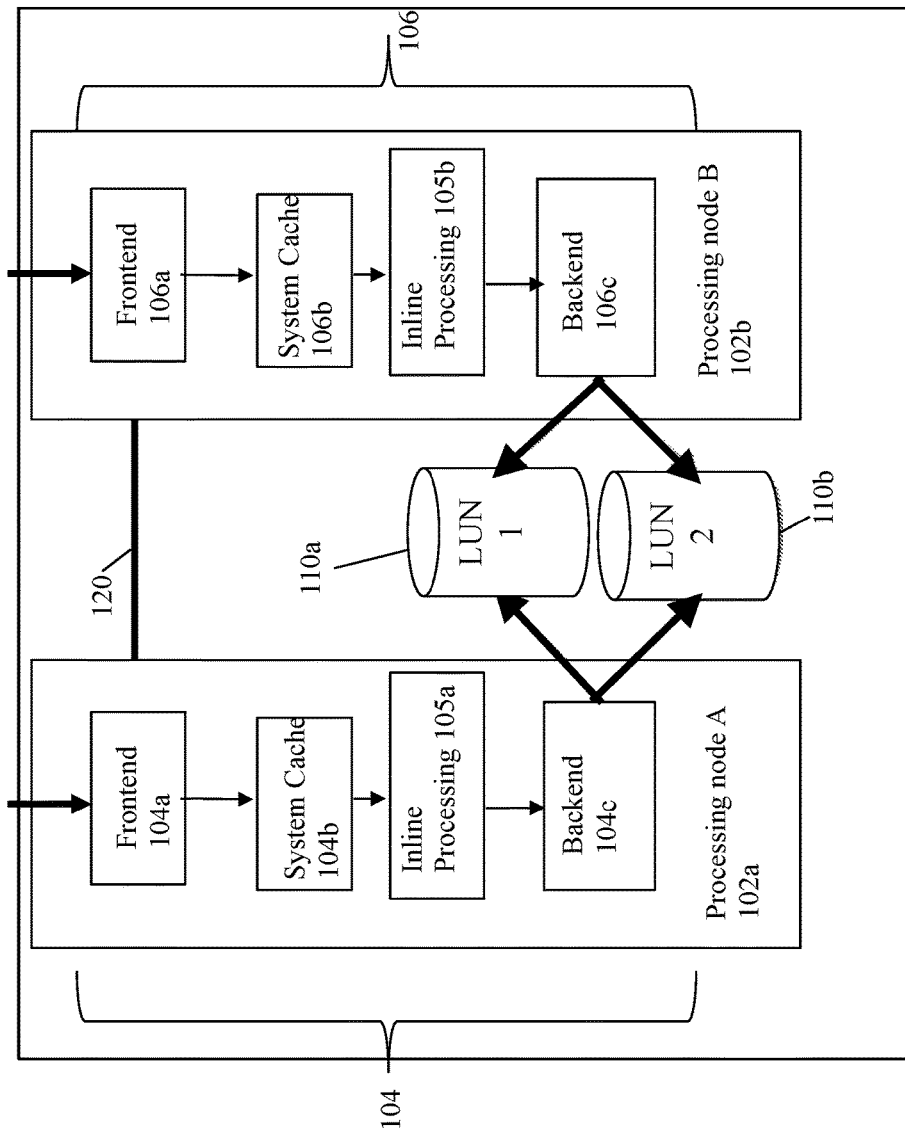
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
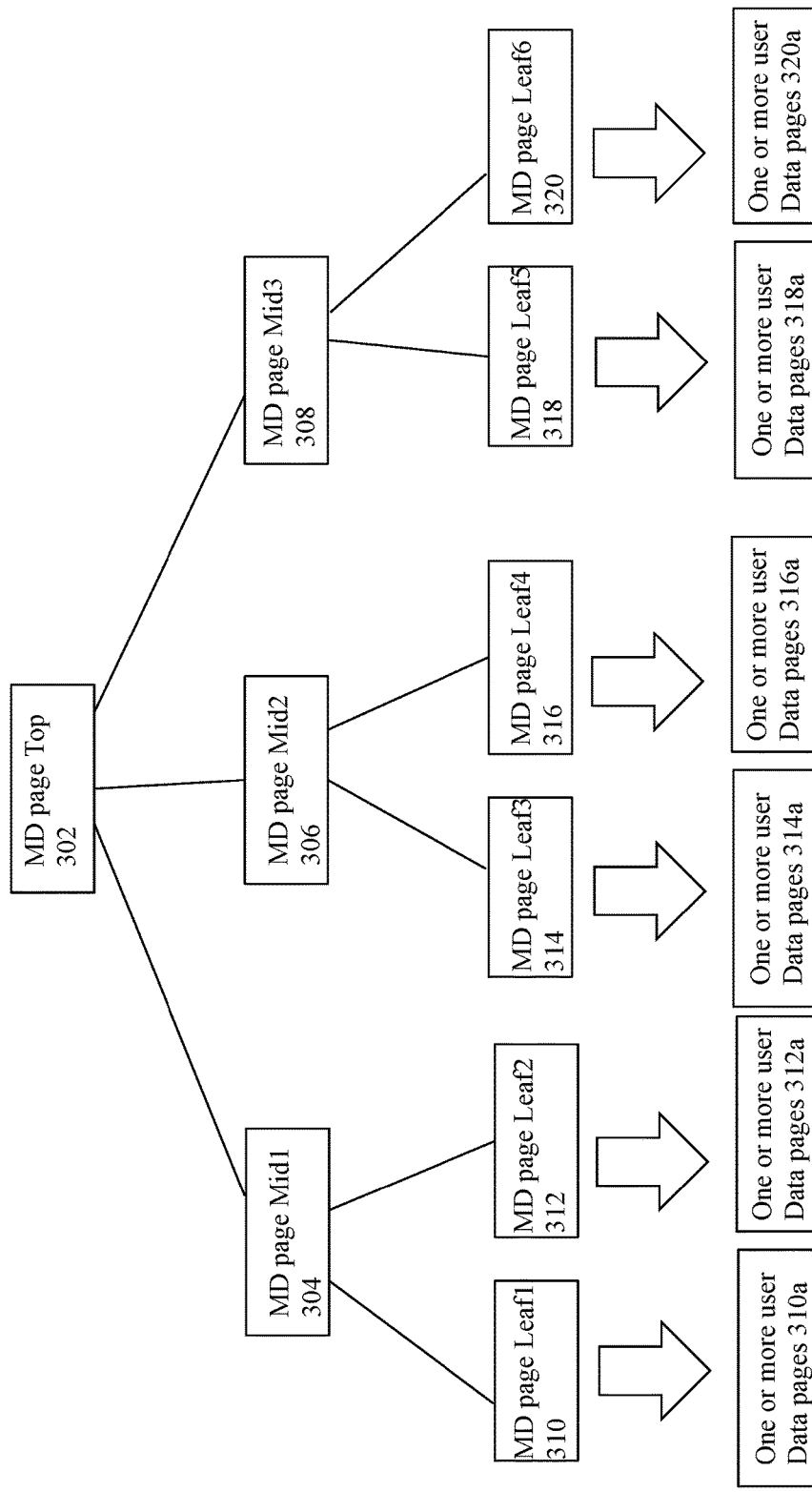
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
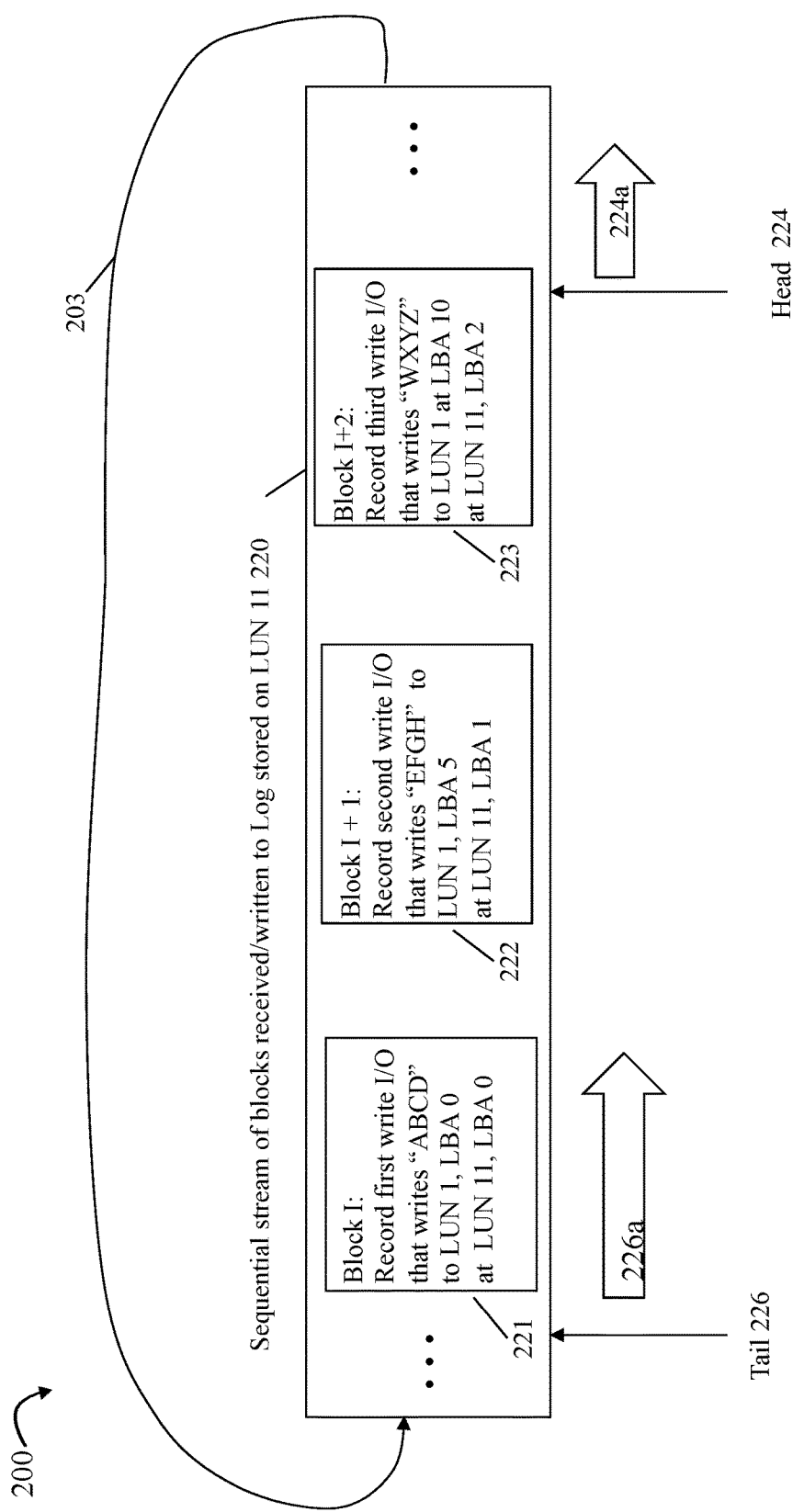
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
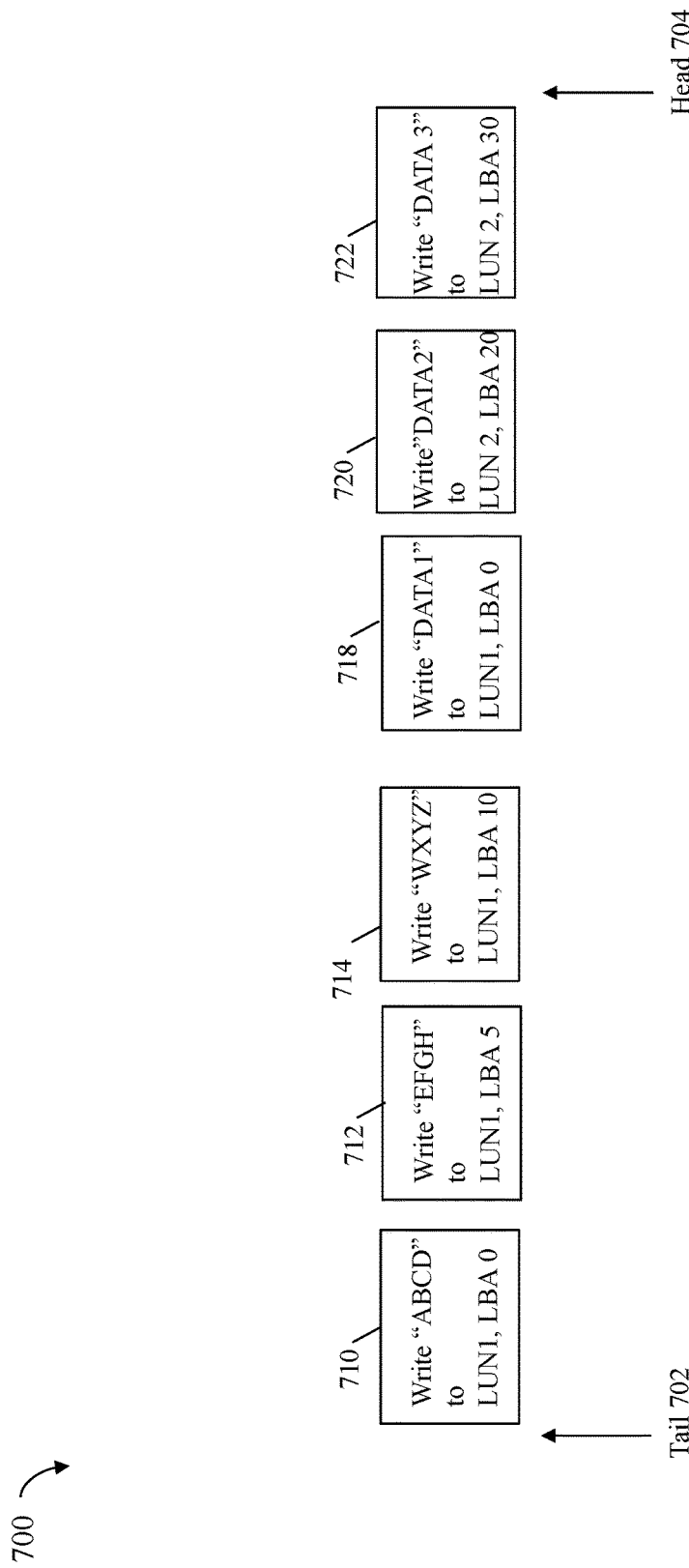

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
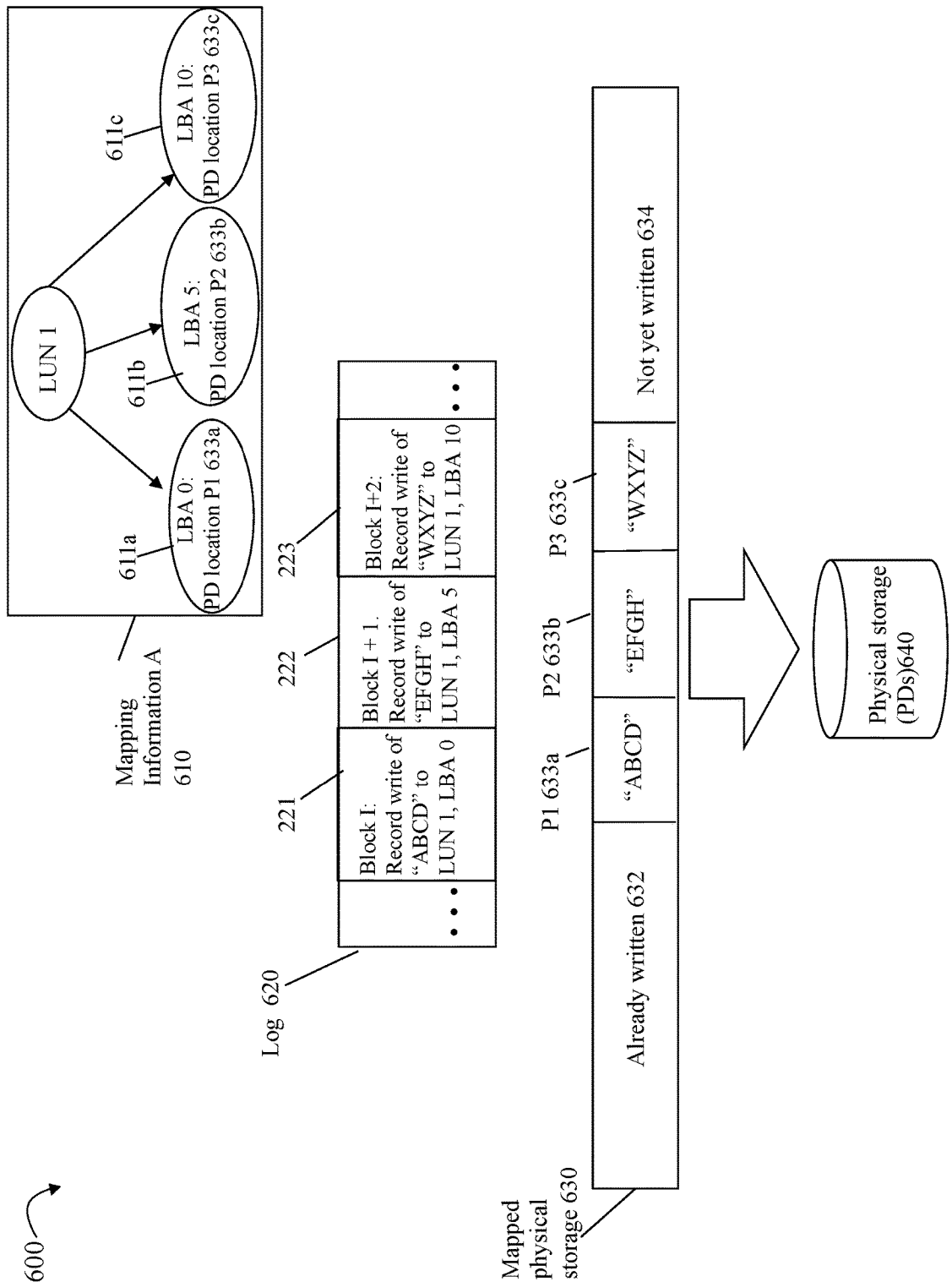

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
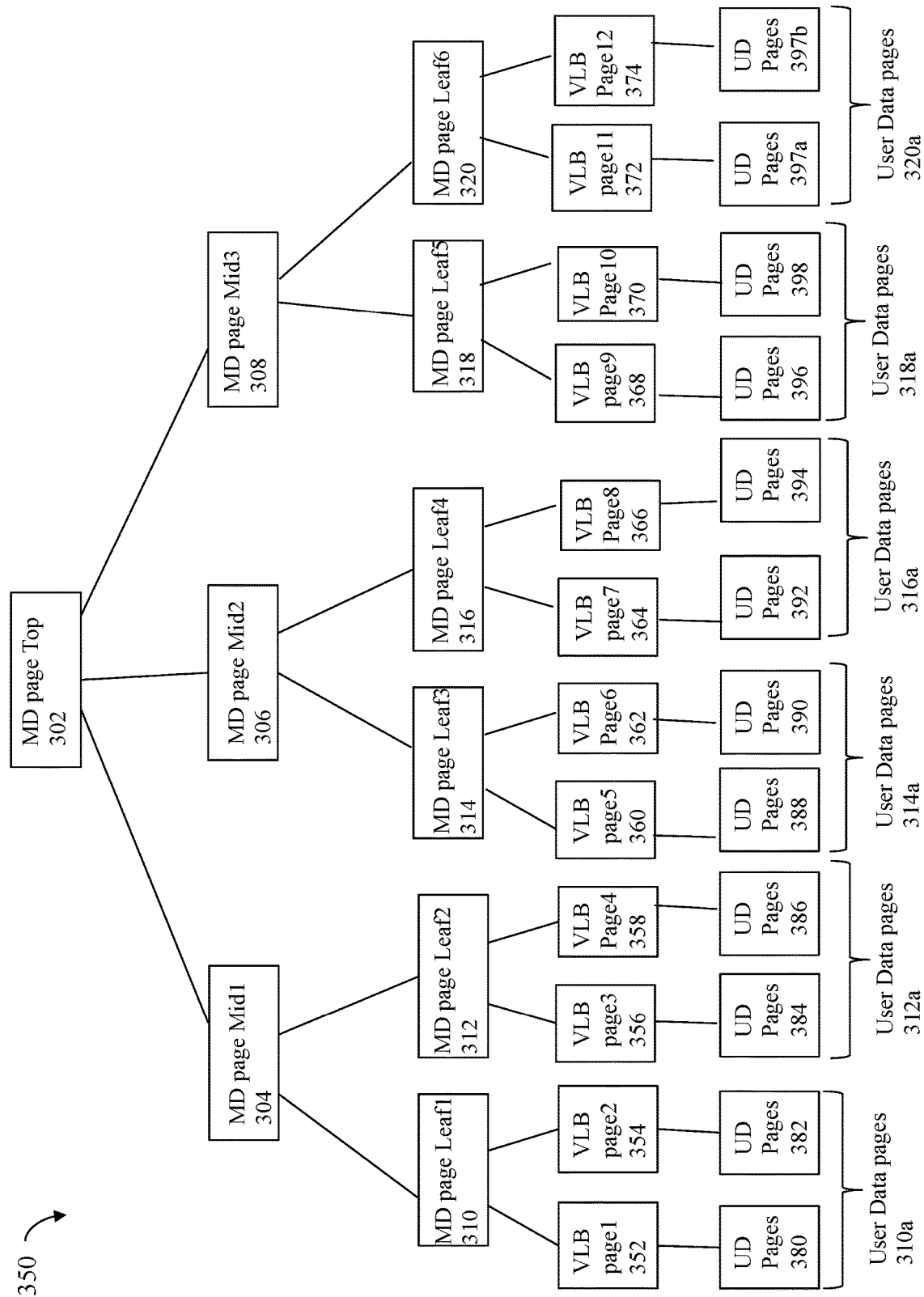

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage locations, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
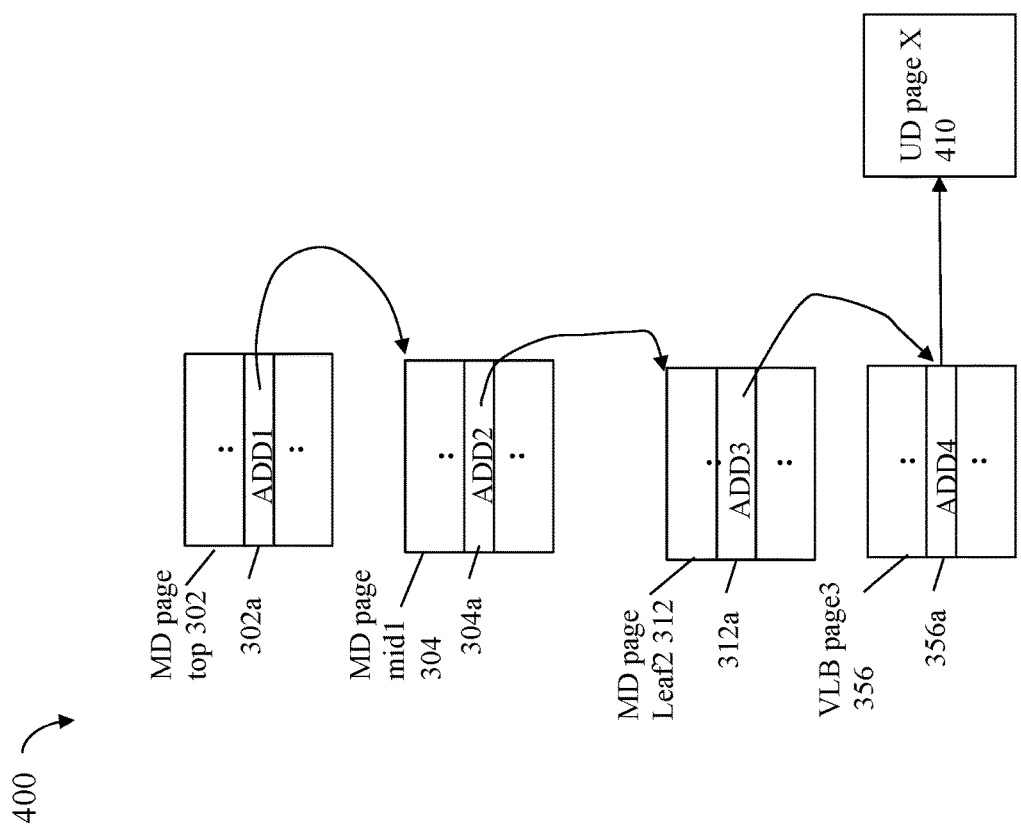

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
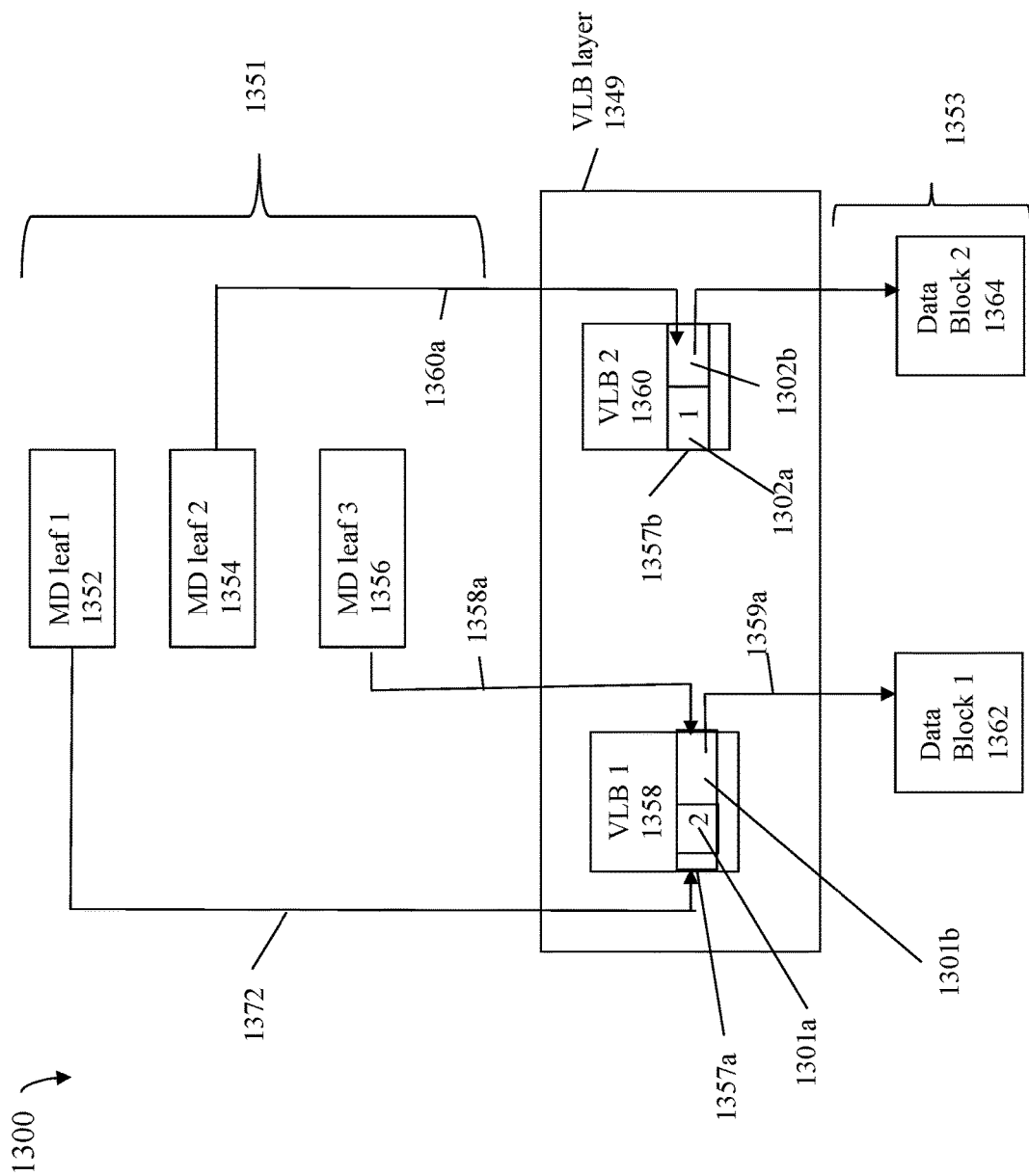

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301*b*).

The element 1372 denotes a pointer to, or address of, the entry 1357*a* in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include the fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field 1302*a* can be a reference count or counter indicating the number of instances of, or references to, the particular data block 1362 (e.g., data block pointed to by 1302*b*).

The reference count 1301*a* can be initialized to 1 when a first or initial instance of the associated data block 1362 is stored. In this example, the reference 1301*a* is 2 indicating that there are 2 instances of the data block 1362 and thus 2 references to the data block 1362. In this case, the are 2 instances of the data block 1362 in stored user data. The instances denoted by the reference count 1301*a* include all deduplicated instances corresponding to entries of the MDL leaves 1352, 1356 that respectively point 1372, 1358*a* to the VLB entry 1357*a* associated with the single copy of the data block 1362.

The reference count 1302*a* can be initialized to 1 when a first or initial instance of the associated data block 1364 is stored. In this example, the reference 1302*a* is 1 indicating that there is 1 instance of the data block 1364 and thus 1 reference to the data block 1364. The instances denoted by the reference count 1302*a* generally include any/all deduplicated instances associated with the single copy of the data block 1364. However, in this example, there is only a single reference to, and single instance of, the data block 1364 in stored user data. In particular, the MD leaf 1354 references or points (1360*a*) to the VLB entry 1357*b* associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

In at least one embodiment, each MD leaf can have multiple entries, such as 512 entries, each corresponding to a different logical address in a logical address range corresponding to the MD leaf.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

Workflows for some implementations to perform reads and writes to the MD page can include loading the entire MD page into the cache or volatile memory of a node, if the MD page is not already in the cache or volatile memory of the node.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, and 6, the reference count associated with a data block can be included in an entry of a VLB page associated with the data block. For example with reference to FIG. 6, the VLB entry 1357*a* includes a field 1301*a* with the reference count=2 for the associated data block 1362; and the VLB entry 1357*b* includes a field 1301*a* with the reference count=1 for the associated data block 1364.

The reference count such as of the VLB entries 1357*a*, 1357*b*, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page. The mapping information can also include a VLB where a MD leaf page entry can reference a VLB entry, and the VLB entry can reference a physical location on BE non-volatile storage.

Described below are techniques of the present disclosure which provide for improved and efficient cache usage and also improved storage system performance.

In at least one embodiment, a user data (UD) or client logical address, which can be the target logical address of a client I/O operation such as a read operation, can be uniquely identified using the volume or LUN ID (identifier), or more generally a storage object or resource ID, in combination with the LBA or offset of the logical address.

The techniques of the present disclosure are described below in an exemplary embodiment of a dual node active-active data storage system or cluster where the two nodes are connected by a network link or connection as discussed above. However more generally, the techniques of the present disclosure can be used in connection with a data storage system including more than two nodes, and generally any suitable number of multiple nodes.

Before discussing the techniques of the present disclosure, reference is made to the example 500 of FIG. 7 to generally illustrate an example of MD layers having some relationships discussed below which can be structured without using the techniques of the present disclosure.

The example 500 includes the logical address space 510, MD top layer 512, MD mid layer 514, MD leaf layer 516, VLB layer, and physical storage layer 530. The example 500 is consistent with the pages or objects discussed elsewhere herein such as, for example, in connection with FIGS. 3, 4, 5 and 6. The logical address space 510 can denote a contiguous logical address range such as of a volume or LUN. The MD top layer 512 can generally include one or more MD top objects or pages although only a single MD top object 512*a* is included for simplicity of illustration. The MD mid layer 514 can generally include one or more MD mid objects or pages although only 3 MD mid objects 514*a-c* are included for simplicity of illustration. The MD leaf layer 516 can include multiple MD leaf objects or pages although 4 MD leaf objects 516*a-d* are included for simplicity of illustration. The VLB layer 520 can generally include VLB objects or pages. The physical storage layer 530 can denote non-volatile BE storage for storing user data or content of logical addresses of the logical address space 510.

Each of the MD objects in the layers 512, 514 and 516 can correspond to a contiguous logical address subrange or portion of the logical address space 510. For example, MD top object 512a can correspond to logical address subrange (0-512 GB], where 512a is included in the chain of MD pages of mapping information for logical addresses in the foregoing corresponding logical address subrange. It should be noted that for MD pages or objects of the example 500 have corresponding logical address portions or subranges specified where each lower bound is included in the subrange (as denoted using "(") and where each upper bound is not included in the subrange (as denoted using "]"). Each of the MD mid objects 514a-c can correspond to a different 1 GB logical address subrange, where 514a corresponds to the subrange (0-1 GB], 514b corresponds to the subrange (1-2 GB]; and 514c corresponds to the subrange (2-3 GB]. In this example, entries of MD top 512a can point to or reference other MD mid objects 514a-c. Each of the MD leaf objects 516a-d corresponds to a different 2 MB logical address subrange where 516a corresponds to the subrange (0-2 MB]; 516b corresponds to the subrange (2 MB-4 MB]; 516c corresponds to the subrange (4 MB-6 MB]; and 516d corresponds to the subrange (6 MB-8 MB]. In this example, entries of MD mid 514a can point to or reference MD leaf objects 516a-d. Consistent with other discussion herein but not explicitly illustrated in FIG. 7, each entry of a MD leaf 516a-d can point to or reference a VLB entry of a VLB included in the VLB layer 520. Each VLB entry can further point to or reference a physical address or storage location in the physical storage layer 530.

In the example 500, each of the objects in the layers 512, 514 and 516 can include 512 entries where each such entry is a pointer or address as noted above.

Figure 7:
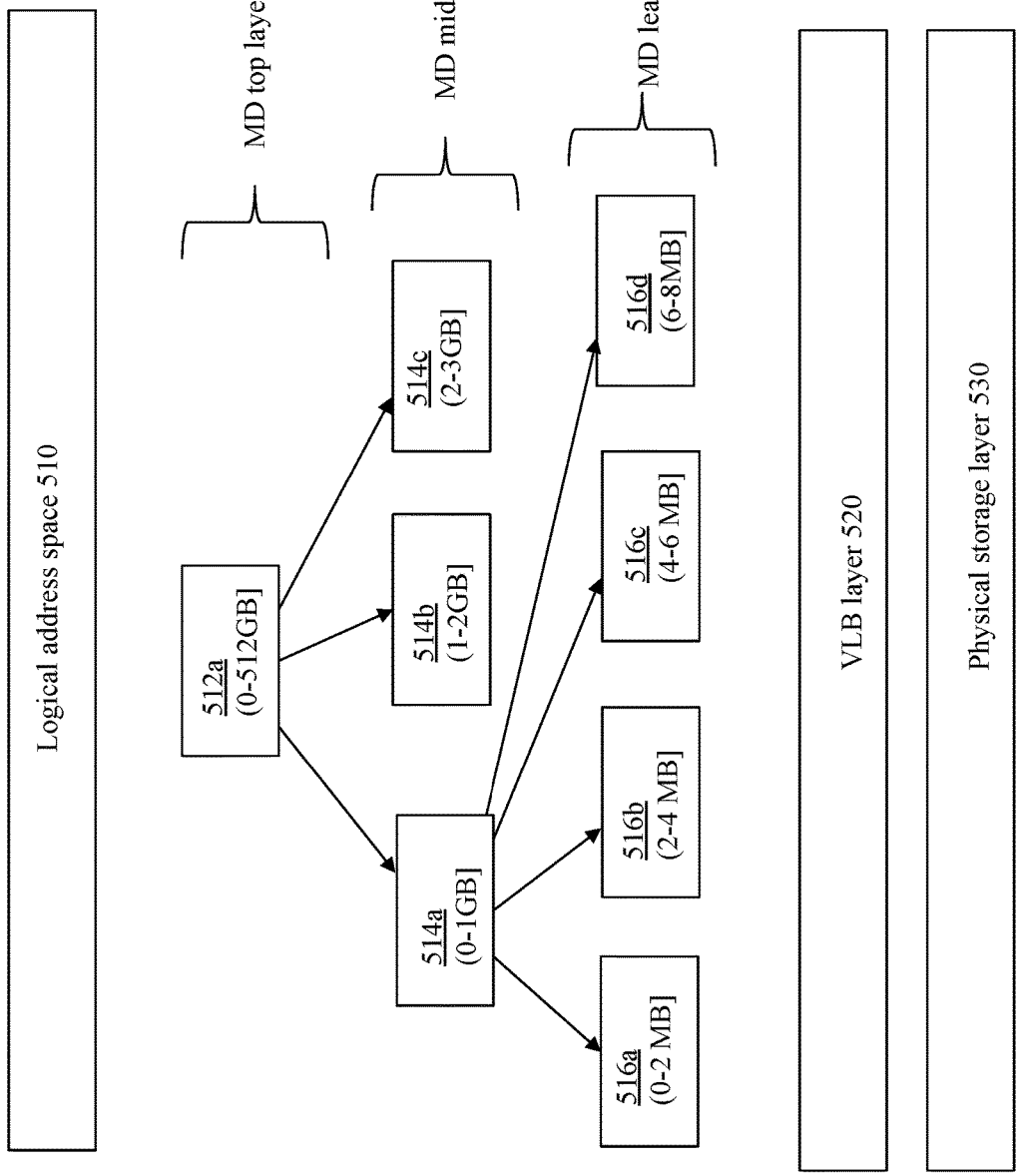
FIG. 7 is an example illustrating a metadata structure including relationships between objects.

In an embodiment not in accordance with the techniques of the present disclosure such as in FIG. 7, exclusive ownership of each of the MD leaf objects of the MD leaf layer can be assigned to any of the multiple nodes in any suitable manner. In this case, all I/Os directed to a logical address in a logical address subrange of a MD leaf can only be serviced by the owning node. If an I/O directed to a logical address is received by an initiator node which does not own the logical address, then the initiator node can forward the I/O to the owning peer node for servicing. In at least one embodiment not in accordance with the techniques of the present disclosure, the MD pages or objects of the layers 512 and 514 can be characterized as weakly owned or shared by multiple nodes. For example, logical addresses of MD leaf 516a can be exclusively owned by node A; and logical addresses of MD leaf 516b can be exclusively owned by node B. However, both nodes A and B can share ownership of the mid MD object 514a and the top MD object 512a since both 512a and 514a are included in the chain of MD pages of mapping information for logical addresses in both MD leaves 516a and 516b. In this manner, there can be contention among the multiple nodes A and B for the MD mid object 514a and the MD top object 512a. Put another way, both nodes A and B can reference the MD mid object 514a and the MD top object 512a when resolving logical addresses using mapping information where the logical addresses correspond to both the MD leaf 516a (owned by node A) and the MD leaf 516b (owned by node B).

The techniques of the present disclosure described in the following paragraphs provide for further reducing contention between the multiple nodes by interleaving pointers or addresses stored in MD top and MD mid objects in order to allow exclusive ownership of such MD top and MD mid objects as well.

In at least one embodiment in accordance with the techniques of the present disclosure, the VLBs of the VLB layer 520 can be weakly owned or shared by the multiple nodes, such as the nodes A and B although other arrangements can also be used in embodiments in accordance with the techniques of the present disclosure.

Figure 8:
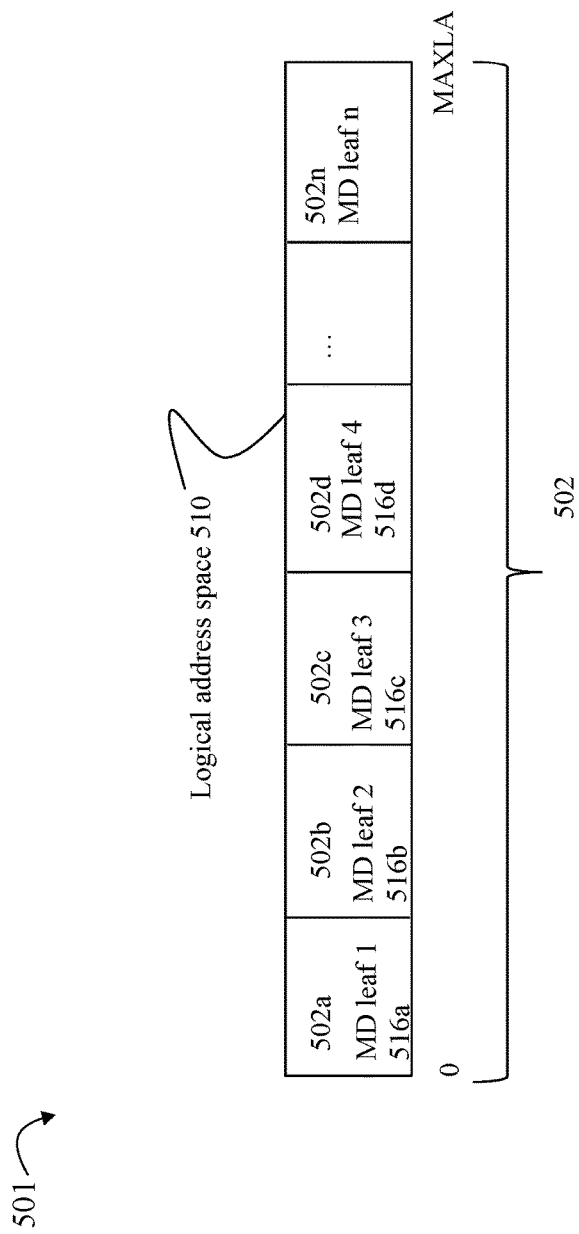
FIG. 8 is an example illustrating a partitioned logical address space in at least one embodiment in accordance with the techniques of the present disclosure.

In at least one embodiment in accordance with the techniques of the present disclosure and with reference to the example 501 of FIG. 8, the user data (UD) logical address space 510 can be partitioned into multiple slices or portions 502, such as denoted by multiple logical address slices or portions 502a-n. Each of the logical address slices or portions 502a-n can be a same size, such as 2 MB (megabytes), or any other suitable size. In at least one embodiment, each logical address space portion or slice 502a-n can be 2 MB to correspond to the logical address subrange of each single MD leaf of the MD leaf layer 516. The multiple address space slices or portions 502a-n can then be divided among the two nodes such that a first of the nodes, such as node A, is assigned exclusive or strong ownership of a first slice set of the logical address slices or portions 502; and a second of the nodes, such as node B, is assigned exclusive or strong ownership of a second slice set of logical address slices or portions 502.

The logical address space 510 can denote an associated logical address space of any one or more storage objects or storage space. The one or more storage objects can include, for example, one or more volumes, logical devices or LUNs; one or more sub-volume or sub-LUN portions; one or more file systems; one or more files; one or more sub-file system portions (e.g., each file system portion being less than an entire file system); and/or one or more vvols or virtual volumes used by one or more virtual machines. Generally, the logical address space 510 can denote a contiguous range of consecutive logical addresses so that each of the logical address slices or portions 502a-n is mapped to a unique subrange of consecutive contiguous logical addresses of the logical address space 510. For example, consider an embodiment where each of the slices or logical address portions 502a-n is 2 MB in size. In this case, the slice 502a can include all logical addresses x in the subrange $0 \leq x < 2$ MB (e.g., (0-2 MB]); the portion 502b can include all logical addresses x in the subrange $2 \text{ MB} \leq x < 4$ MB (e.g., (2 MB-4 MB]); and so on.

The logical address slices or portions 502 can be partitioned into the two slice sets where each slice or logical address portion 502-n is included in only one of the two slice sets. In at least one embodiment, the logical address slices 502 can be partitioned equally as possible between the two nodes A and B although other unequal partitionings can also be suitable for use with the techniques of the present disclosure.

In at least one embodiment, the logical address slices of the contiguous logical address space 510 can alternate in connection with exclusive ownership assignment among the nodes A and B. In this manner, the logical address space 510 can be interleaved among the nodes A and B. For example with reference to FIG. 8 the slices 502a-n can correspond to consecutive contiguous logical address subranges of the logical address space 510, where 0 can denote the starting or lowest logical address of 510 and MAXLA can denote the ending or highest logical address of 510. Assuming each of the slices 502a-n is 2 MB and thus corresponds to a different MD leaf, the first 2 MB subrange (e.g., logical addresses (0 through 2 MB]) of 510 can correspond to the slice 502a; the second 2 MB subrange (e.g., logical addresses (2 MB through 4 MB]) of 510 can correspond to the slice 502b; the third 2 MB subrange (e.g., logical addresses (4 MB through 6 MB]) of 510 can correspond to the third slice 502c; the fourth 2 MB subrange (e.g., logical addresses (6 MB through 8 MB]) of 510 can correspond to the fourth slice 502d, and so on, for each slice in 510.

In at least one embodiment, each slice 502a-n can be assigned a corresponding unique slice identifier or ID which is an integer ID in a consecutive integer sequence corresponding to a relative position in a consecutive and contiguous ordering of the logical address subranges of the slices. For example, the slice 502a has an ID of "1", the slice 502b has an ID of "2", the slice 502c has an ID of "3", and so on, as the associated logical address subranges of the slices increase. In at least one embodiment, ownership of a slice of the logical address space 510 can be derived from or based on the relative consecutive ordering or placement of the slice itself. For example, as noted above, the exclusive owner of a logical address slice can be based on whether the slice has an associated even or odd slice ID. In at least one embodiment, all odd slices with odd slice IDs (e.g., slices 516a, 516c, and so on) can be included in a first slice set exclusively owned by node A, and all even slices with even slice IDs (e.g., slices 516b, 516d, and so on) can be included in a second slice set exclusively owned by node B.

In at least one embodiment, MD pages or objects included in the mapping information for logical addresses 510 can be partitioned among the two nodes A and B. In such an embodiment, a first MD set of the MD top, mid and leaf objects can be associated with only the odd slices where the first set's MD top and mid objects are only associated with odd slices or odd MD leaf objects. In this case, the MD mid pages of the first MD set can include only pointers or addresses to odd MD leaf objects corresponding to odd slices; and the MD top pages of the first MD set are only associated with MD mid pages of the first MD set which reference only the odd MD leaf objects or slices. Also, a second MD set of the MD top, mid and leaf objects can be associated with only the even slices where the second MD set's MD top and mid objects are only associated with even slices or even MD leaf objects. In this case, the MD mid pages of the second MD set can include only pointers or addresses to even MD leaf objects corresponding to even slices; and the MD top pages of the second MD set are only associated with MD mid pages of the second MD set which reference only the even MD leaf objects or slices.

In such an embodiment with reference back to FIG. 4, the top, mid, and leaf MD pages can be partitioned or divided into the foregoing two MD sets, where the node A can be assigned exclusive ownership of the first MD set of MD pages, and where the node B can be assigned exclusive ownership of the second MD set of MD pages. Generally, in at least one embodiment, the partitioning of the logical address space and the partitioning of the MD top, mid and leaf objects regarding exclusive ownership can be performed in a manner such that a slice set and its corresponding MD top, mid and leaf objects used to map logical addresses of such slices of the slice set can be exclusively owned by the same node. In at least one embodiment, each MD leaf can denote a contiguous 2 MB logical address space slice.

Figure 9A:
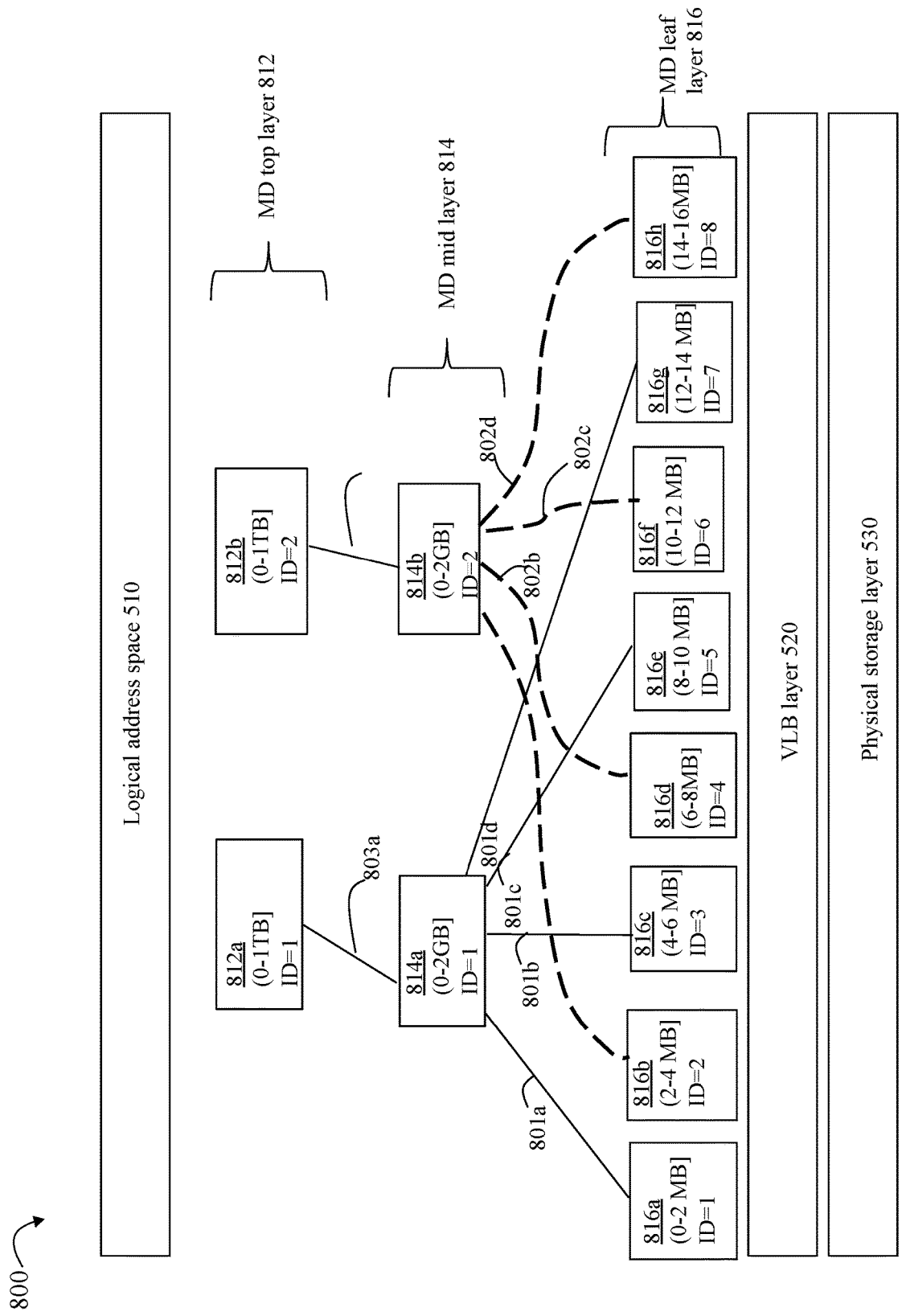
FIGS. 9A, 9B and 9C illustrate various layers and metadata structures in at least one embodiment in accordance with the techniques of the present disclosure.

Referring to the example 800 of FIG. 9A, shown is an example illustrating an interleaved logical address space and corresponding top, mid and leaf MD objects describing the interleaved logical address space in at least one embodiment in accordance with the techniques of the present disclosure.

The example 800 includes MD layers 812, 814 and 816 which correspond, respectively, to the MD layers 512, 514 and 516 of FIG. 7.

Consistent with discussion above and with reference to FIG. 9A, the slices of the logical address space 510 (and thus MD leaf objects 816a-h of layer 816) can be interleaved such that each of the nodes A and B can be assigned alternating contiguous 2 MB logical address space slices each uniquely associated with a different MD leaf. For example, node A can be assigned MD leaves for logical addresses 0-2 MB, 4-6 MB (e.g., MD leaf objects 816a, 816c 816e, 816g), and so on, where such MD leaves and slices have odd IDs; and node B can be assigned MD leaves for logical addresses 2-4 MB and 6-8 MB (e.g., MD leaf objects 816b, 816d, 816f, 816h) and so on, where such MD leaves and slices have even IDs.

In at least one embodiment a 2 GB logical address portion can be associated with each mid MD object of the MD mid layer 814. In such an embodiment, the MD leaf objects can be partitioned into even and odd groupings such as based on MD leaf object IDs noted above where a 2 GB mid MD object 814a which is mapped to only odd MD leaf objects (e.g., 816a, 816c, 816e, 816g) can be designated as an odd mid MD object assigned to exclusive node owner A; and where a 2 GB mid MD object 814b which is mapped to only even MD leaf objects (e.g., 816c, 816d, 816f 816h) can be designated as an even mid MD object assigned to exclusive node owner B. In at least one embodiment, MD mid objects such as 814a-b can be assigned IDs in a manner similar to MD leaf objects with the difference that odd MD mid object IDs (e.g., ID=1) are associated with MD mid objects (e.g., MD mid object 814a) which only point to odd MD leaf objects (e.g., 816a, c, e, g), and even MD mid object IDs (e.g., 2) are associated with MD mid objects (e.g., 814b) which only point to even MD leaf objects (e.g., 816b, d, f, h).

In at least one embodiment, a 1 TB logical address portion can be associated with each top MD object of the MD top layer 812. In such an embodiment, the MD top object 812a which is mapped only to odd MD mid objects (e.g., 814a) can be designated as an odd MD top object assigned to exclusive owner A; and where the MD top object 812b which is mapped only to even MD mid objects (e.g., 814b) can be designated as an even MD top object assigned to exclusive owner B. In at least one embodiment, MD top objects such as 812a-b can be assigned IDs in a manner similar to MD mid objects with the difference that odd MD top object IDs (e.g., ID=1) are associated with MD top objects (e.g., 812a) which only point to odd MD mid objects (e.g., 814a), and even MD top object IDs (e.g., 2) are associated with MD top objects (e.g., 812b) which only point to even MD mid objects (e.g., 814b).

Effectively, the example 800 illustrates an embodiment including two trees or hierarchical structures of MD pages for the same logical address space such as, for example, of the same volume or LUN. A first tree or structure can designated as the odd tree or structure associated with only odd slices or odd MD leaf objects of the logical address space. The first tree or structure can include MD objects 812a, 814a, 816a, 816c, 816e and 816g, where relationships or pointers connecting pairs of such objects are denoted by 803a and 801a-d. Element 803a can denote the pointer from MD top object 812a to MD mid object 814a. Elements 801a-d can denote the pointers from MD mid object 814a to the odd MD leaf objects 816a, c, e and g. A second tree or structure can designated as the even tree or structure associated with only even slices or even MD leaf objects of the logical address space. The second tree or structure can include MD objects 812b, 814b, 816b, 816d, 816f and 816h, where relationships or pointers connecting pairs of such objects are denoted by 803b and 802a-d. Element 803b can denote the pointer from MD top object 812b to MD mid object 814b. Elements 802a-d can denote the pointers from MD mid object 814b to the even MD leaf objects 816b, d, f and h.

Figure 9B:
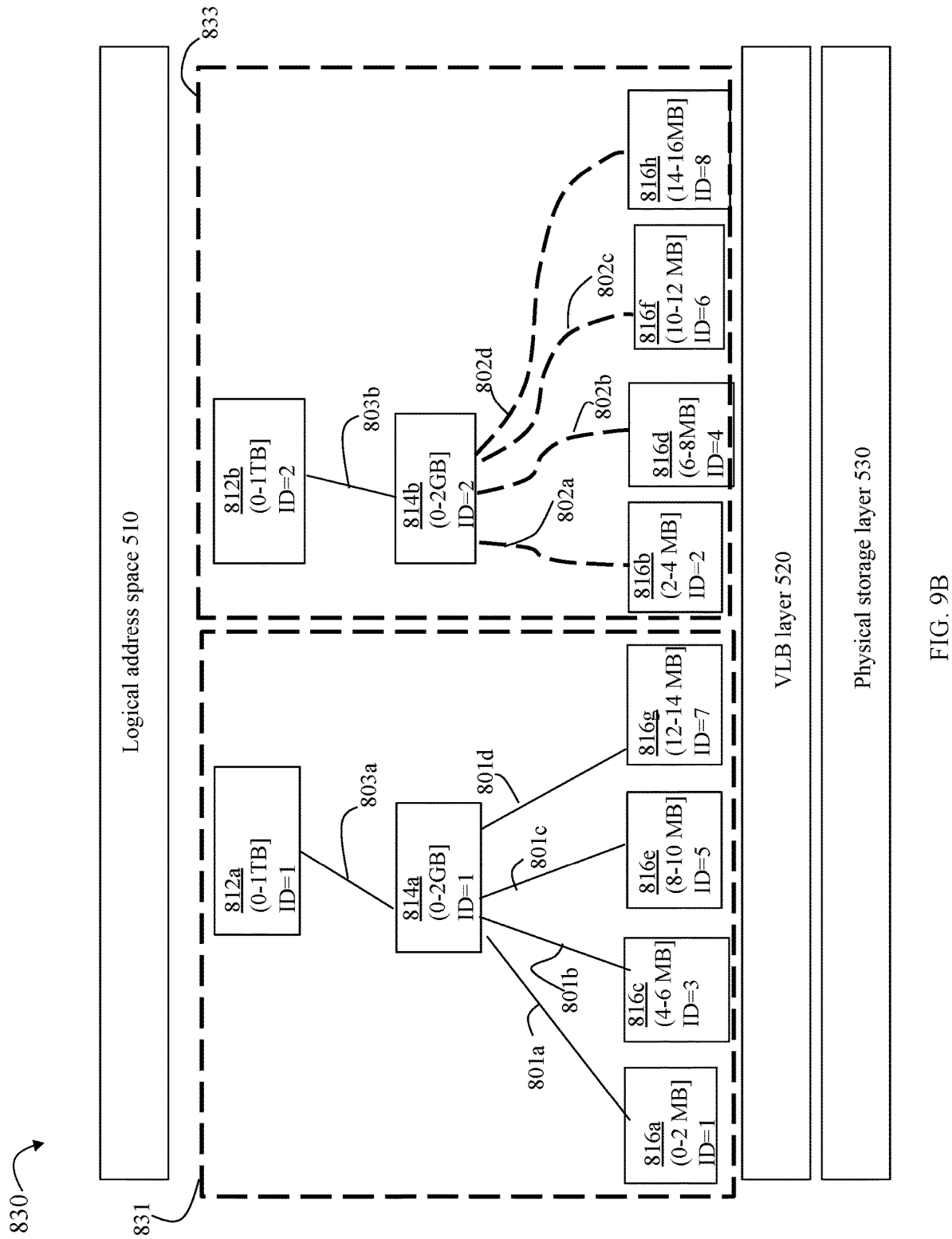

Referring to FIG. 9B, shown is an example 830 which includes the same elements as the example 800 of FIG. 9A with the difference that the various objects and pointers or relationships of the above-noted first and second trees or structures are visually further separated. In particular, the element 831 denotes the above-noted first or odd tree or structure which can be exclusively owned by and assigned to node A, and the element 833 denotes the above-noted second or even tree or structure which can be exclusively owned by and assigned to node B. In one aspect, the aggregate of 831 and 833 can collectively denote an interleaved tree or hierarchical structure such as illustrated in FIG. 9A.

Figure 9C:
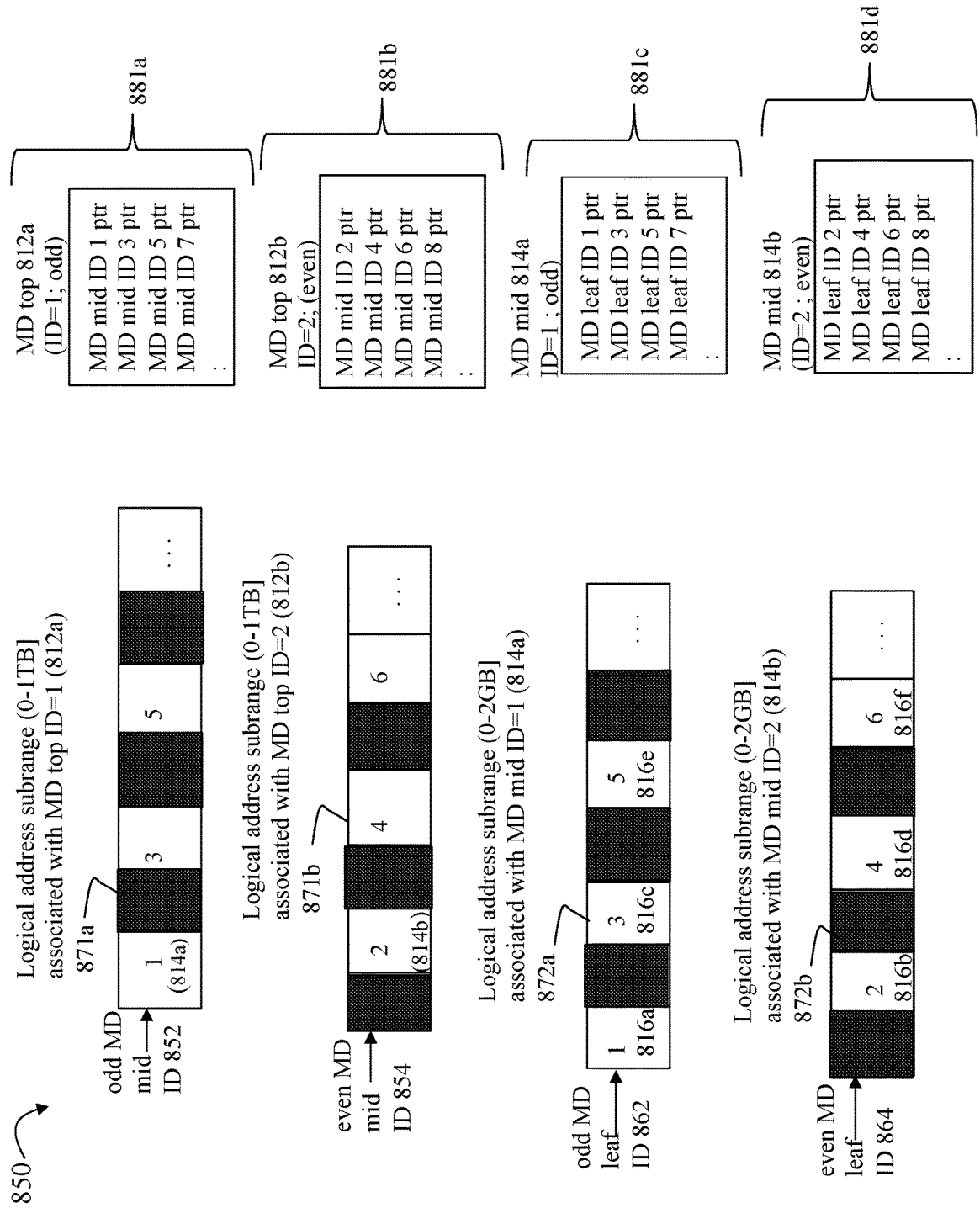

Referring to FIG. 9C, shown is an example 850 illustrating further detail regarding the logical address subranges and references or relationships between MD objects of the examples 800 and 830 in at least one embodiment in accordance with the techniques of the present disclosure.

The example 850 includes element 871a representing the 1 TB logical address subrange associated with the MD top object 812a (ID=1). The element 871a indicates which odd MD mid object IDs 852 are referenced or pointed to by MD top object 812a. The element 871a also shows, within the 1 TB logical address subrange of the MD top 812a, a relative position of the 2 GB logical address subrange of each referenced odd MD mid object. The blacked out portions of 871a correspond to logical address subranges not mapped by MD top 812a. The blacked out portion of 871a correspond to logical address subranges of even MD mid objects not referenced or pointed to by MD top object 812a.

The example 850 includes element 871b representing the 1 TB logical address subrange associated with the MD top object 812b (ID=2). The element 871b indicates which even MD mid object IDs 854 are referenced or pointed to by MD top object 812b. The element 871b also shows, within the 1 TB logical address subrange of the MD top 812b, a relative position of the 2 GB logical address subrange of each referenced even MD mid object. The blacked out portions of 871b correspond to logical address subranges not mapped by MD top 812b. The blacked out portions of 871b correspond to logical address subranges of odd MD mid objects not referenced or pointed to by MD top object 812b.

The example 850 includes element 872a representing the 2 GB logical address subrange associated with the MD mid object 814a (ID=1). The element 872a indicates which odd MD leaf object IDs 862 are referenced or pointed to by MD mid object 814a. The element 872a also shows, within the 2 GB logical address subrange of the MD mid 814a, a relative position of the 2 MB logical address subrange of each referenced odd MD leaf object. The blacked out portions of 872a correspond to logical address subranges not mapped by MD mid 814a. The blacked out portions of 872a correspond to logical address subranges of even MD leaf objects not referenced or pointed to by MD mid object 814a.

The example 850 includes element 872b representing the 2 GB logical address subrange associated with the MD mid object 814b (ID=2). The element 872b indicates which even MD leaf object IDs 864 are referenced or pointed to by MD mid object 814b. The element 872b also shows, within the 2 GB logical address subrange of the MD mid 814b, a relative position of the 2 MB logical address subrange of each referenced even MD leaf object. The blacked out portions of 872b correspond to logical address subranges not mapped by MD mid 814b. The blacked out portions of 872b correspond to logical address subranges of odd MD leaf objects not referenced or pointed to by MD mid object 814b.

Thus, the elements 871a-b and 872a-b illustrate in more detail the interleaved address space subranges associated with corresponding MD top and mid objects.

As noted above, each of the top, mid and leaf MD pages or objects can include 512 addresses or pointers. The element 881a provides further detail of information that can be included in the MD top object 812a. The element 881a indicates that the MD top object 812a can include pointers to, or addresses of, odd MD mid objects such as 814a. The element 881b provides further detail of information that can be included in the MD top object 812b. The element 881b indicates that the MD top object 812b can include pointers to, or addresses of, even MD mid objects such as 814b. The element 881c provides further detail of information that can be included in the MD mid object 814a. The element 881c indicates that the MD mid object 814a can include pointers to, or addresses of, odd MD leaf objects such as 816a, c, e, and g. The element 881d provides further detail of information that can be included in the MD mid object 814b. The element 881d indicates that the MD mid object 814b can include pointers to, or addresses of, even MD leaf objects such as 816b, d, f, and h.

As denoted by 881a-b, each MD top object 812a-b can be associated with the same 1 TB logical address subrange. However, due to the interleaving, each MD top object 812a-b actually maps a different ½ TB (e.g., 512 GB) portion of the logical addresses within the associated 1 TB range. Thus, the associated 1 TB logical address subrange represents the aggregate or collective logical addresses mapped both MD top objects 812a-b. In a similar manner, as denoted by 881c-d, each MD mid object 814a-b can be associated with the same 2 GB logical address subrange. However, due to the interleaving, each MD mid object 814a-b actually maps a different 1 GB portion of the logical addresses within the associated 2 GB range. Thus, the associated 2 GB logical address subrange represents the aggregate or collective logical addresses mapped both MD mid objects 814a-b.

To generalize, with 2 nodes in at least one embodiment, the logical address subrange associated with each MD mid and top object can be twice the size of such subranges as illustrated in FIG. 7. As a further illustration of the techniques of the present disclosure, consider an embodiment with 4 nodes as also discussed above. With 4 nodes, the logical address subrange associated with each MD mid and top object can be twice the size of such subranges as illustrated in FIG. 7. For example, in at least one embodiment with 4 nodes, the logical address subrange associated with each MD mid object can be 4 GB, the logical address subrange associated with each MD top object can be 2 TB, and the techniques of the present disclosure can result in 4 trees or hierarchical structures of MD objects describing the logical address space, where each of the 4 trees or structures of MD objects can include MD leaf, mid and top objects exclusively owned by one of the 4 nodes. The 4 trees or structures can be constructed in a manner similar to that as described above with 2 nodes with the difference that the logical address space is partitioned or sharded into 4 slices sets, and where each of the 4 slice sets has corresponding MD top, mid and leaf objects included in a single one of the trees or structures exclusively owned by a single one of the nodes. Generally, for N nodes, the logical address subrange associated with each MD mid object can be partitioned into portions each corresponding to the size of a single slice or MD leaf object's logical address subrange (e.g., 2 MBs), and each MD mid object can include a reference or pointer to every Nth MD leaf object. The logical address subrange of each MD top object can be partitioned into portions each corresponding to the logical address subrange of a MD mid object, and each MD top object can include a reference or pointer to every Nth MD mid object. In this manner, a first tree T1 of the 4 trees can include a first set of MD leaf objects exclusively owned by node 1, where T1 includes MD mid objects which only point to or only reference MD leaf objects of the first set, and where T1 includes MD top object which only point to or only reference MD mid objects which further reference or point to MD leaf objects of the first set. Each of the remaining 4 trees can be similarly constructed in accordance with a set of MD leaf objects owned by a single different one of the 4 nodes.

In at least one embodiment, each node can be allowed to perform operations on slices and MD pages which are exclusively owned by the node without any internode synchronization and with node-local locking. In at least one embodiment, when an I/O directed to a slice including an associated target logical address LA1 is received by an initiator node that does not own the slice (and thus does not own LA1), the initiator node can forward the I/O for servicing to the peer node which owns the slice (and thus owns LA1). Otherwise, if the initiator node owns the slice, and thus LA1, the initiator node can service the I/O. In this manner in at least one embodiment, the owning node of LA1 can perform mapper resolution processing as may be needed when servicing the I/O where such resolution processing can use the chain of MD pages of mapping information which maps LA1 to a corresponding physical location PA1 containing content C1 stored at LA1.

In at least one embodiment, responsibility to route I/Os directed to a logical address can include routing the I/O to the node which owns the logical address. This can be accomplished as noted above and elsewhere herein by the storage system where an initiator node which does not own the logical address of a received I/O operation can forward the I/O to its peer for servicing. In at least one embodiment, the host sending the I/Os can include multi-pathing components or modules which can select to send I/Os directed to a logical address over a preferred path to an owning node. In one such embodiment, the host can track or otherwise be provided with information regarding which paths are preferred and should be used for sending I/Os directed to particular logical address subranges of different volumes or other storage objects.

In at least one embodiment, resolution processing with respect to a logical address LA1 can include traversing the chain of MD pages of mapping information which maps LA1 to a corresponding physical address PA1 including C1 stored at LA1. In particular, the resolution processing traverses the chain of MD pages until an entry E11 of a MD leaf is reached, where E11 includes a VLB address, V1, which points to, or is an address of, an entry E12 of a target VLB, VLB1. The resolution processing can generally use the VLB address V1 to obtain a PLB address, PA1, where C1 is stored at PA1. Processing includes using V1 to read entry E12 of VLB1, where E12 has the address, location or offset denoted by the VLB address V1. Entry E12 of VLB1 includes the PLB address PA1 whereby reading E12 includes reading PA1. PA1 can then be used to read the content C1 for LA1 from non-volatile BE storage. Such resolution processing with respect to LA1 can be performed, for example, in connection with servicing a read I/O. Such resolution processing can also be performed in connection with flushing and destaging a recorded write I/O of the log where such flushing and destaging can include allocating and/or updating MD pages as may be needed.

In connection with processing described herein in at least one embodiment, a read I/O operation requesting to read content C1 from a logical address LA1 can be serviced using content that may be included in a user data (UD) log. In at least one embodiment, the UD log can be as described elsewhere herein where content written by a write I/O can be stored in the UD log and then subsequently destaged to BE non-volatile storage. A read I/O directed to LA1 may possibly be serviced using the UD log if the UD log includes C1 as stored at LA1. In this case, the requested content C1 for LA1 is serviced using content of the UD log rather than reading from PA1 located on the non-volatile BE storage.

Consistent with other discussion herein, mapping information including the chain of MD pages can be updated and/or created when flushing a recorded write I/O writing content C2 to a logical address LA2 from the UD log to BE non-volatile storage. Flushing processing can include storing the written content C2 on BE non-volatile storage at a PLB address PA2. For the first or initial write to LA2, flushing processing can also include allocating any needed VLB or other MD objects included in the chain of MD pages of mapping information mapping LA2 to PA2.

In at least one embodiment, if a write I/O is directed to a target logical address range spanning across both an even slice and an odd slice, any needed MD objects of both the even MD tree and odd MD tree can be allocated and/or updated when the write I/O is destaged from the log.

In at least one embodiment, a MD page split operation can be performed with respect to an existing MD page. In at least one embodiment, the MD page split operation can be performed, for example, in connection with a snapshot of a base storage object such as a source LUN or volume. For example, at a first point in time T1 a snapshot of a LUN can include the same data as the source LUN. Thus at time T1 some of the same MD pages or objects can be used to map logical addresses of both the LUN and its snapshot. For example, the source LUN and its snapshot can each have their own MD top objects but can commonly use the same MD mid and leaf objects. Subsequently, at a second point in time T2, there can be writes to the source LUN. However, the snapshot can still include the same content of the source LUN as prior to the writes. As a result of the writes to the source LUN, one or more existing MD pages or objects used to map logical addresses of the source LUN to corresponding content can be modified. However, prior to modifying the existing MD pages of the source LUN, a MD page split operation can be performed to preserve or duplicate the existing MD page content in a new MD page for use with the snapshot. The MD page split can include allocating a new MD page where the content of the existing MD page is copied to the new MD page. In at least one embodiment in accordance with the techniques of the present disclosure with two nodes and thus an even MD tree and an odd MD tree as discussed elsewhere herein (e.g., FIGS. 9A, 9B and 9C), the MD split operation can be performed as needed to MD objects of the even MD tree and odd MD tree. If, for example, a write is made to the source LUN which only modifies content of an odd slice of the odd MD tree, then a write split can be performed with respect to impacted MD mid and/or leaf objects of the odd MD tree. If, for example, a write is made to the source LUN which only modifies content of an even slice of the even MD tree, then a write split can be performed with respect to impacted MD mid and/or leaf objects of the even MD tree.

Generally, an embodiment can support different operations or requests in addition to read and write I/O requests. Such supported operations or requests can generally include other commands or operations which can read content from and/or write content to, one or more logical addresses. Implementation of such other commands or operations can be in accordance with read and write I/O processing as described herein. For example, an embodiment can support various commands or operations which generally read and/or modify content. In some embodiment, additional commands, requests and/or operations can be supported and used for modifying, writing, overwriting, deleting or removing content of a storage resource or object. For example, in at least one embodiment, supported commands or operations can include one or more of the following operations: write I/O operation, and an UNMAP command or operation (e.g., storage reclamation operation). In some embodiment, supported operations can include offload copy operations, commands or methods such as the XCOPY (extended copy) command and ODX (offload data transfer) command where such operations modify or write content to destination or targets. In at least one embodiment, the supported commands can include one or more offload copy methods or commands, such as the XCOPY and the ODX command, where such offload commands can be used for data copying between targets in the same system. The XCOPY command is a SCSI command included in the SCSI standard. The ODX command is a token-based offload copying command. Existing implementations, for example, can use XCOPY and/or ODX for copying within a single system. Generally, the offload copy operation request can be issued by an external data storage system client, such as a host, as well as an internal data storage system client. In at least one embodiment, the offload copy operation or command, such as the XCOPY command noted above, is a request to perform an offload copy operation from a source to a destination or target. The source and the destination of the XCOPY or other offload copy operation can be specified in any suitable manner. For example, in at least one embodiment, the source can identify one or more logical devices or LUNs, and an associated LBA range of each of the one or more LUNs of the source; and the destination can also identify one or more logical devices or LUNs, and an associated LBA range of each of the one or more LUNs of the destination. The particular manner in which the LUNs are identified can vary with the particular protocol used to access the LUNs. For example, in at least one embodiment in accordance with the SCSI protocol, a LUN of the source or destination of the XCOPY command can be identified using the world wide name (WWN) used to uniquely identify the LUN at a protocol level identifier across the first and second systems, or more generally across multiple data storage systems. Such an offload copy command like XCOPY requests or instructs the data storage system to generally perform an offload copy command internal within the data storage system because both the source and destination of the copy command are within the same data storage system. Generally, the client, such as the host, requests using the XCOPY command that the data storage system manage the copying of the data from the source to the destination. The source and destination of the XCOPY command refer to storage objects, such as block-based addresses of logical devices, volumes, or LUNs, typically in the same system. For example, the source may be a location or logical address on a source device denoting a source LUN of the data storage system that received the XCOPY command. The destination or target of the XCOPY command may be a location or logical address on a target device that is also a logical device denoting the destination or target LUN of the data storage system that received the XCOPY command. In an embodiment supporting such offload copying operations, the structure 220 can also include additional fields to identify not only the target but also the source of the operation.

In at least one embodiment, supported commands can include a WRITE SAME command. In at least one embodiment, the WRITE SAME command can be used to fill or write to a range of blocks on disk with a pattern or block of data specified by the command. For example, WRITE SAME can be used to write zeroes or some other specified content to a range of blocks.

For such supported commands which can modify a target logical address, processing can be performed in a manner similar to that as described herein for a write command. In particular, servicing such supported commands which modify a target location can include allocating and/or updating one or more MD objects of an even MD tree and/or odd MD tree depending on whether the impacted logical addresses of the target location are in even or odd slices. In a similar manner, servicing such supported commands which read from a target location can include using MD objects of an even MD tree and/or odd MD tree depending on whether the impacted logical addresses of the target location are in even or odd slices.

In at least one embodiment which supports offload copy operations such as XCOPY, the source and the target logical addresses can both be owned by the same node. In this case, the owning node can service the offload copy operation. As a variation, the source logical address or location and the target logical address or location can be owned by different nodes such as, for example, where the source logical address is in an even slice and the target logical address is in an odd slice. In at least one embodiment where the source and target of the offload copy operation are owned by different nodes, one of the nodes, such as the initiator node receiving the XCOPY operation can service the XCOPY operation. Alternatively, the node which owns the target logical address can service the XCOPY operation. The node servicing the XCOPY operation can be node A which can own, for example, the even slices and its peer node can own the odd slices. In such an embodiment, node A can service the XCOPY by acquiring any needed locks from the peer node in connection with the impacted odd slices associated with the XCOPY operation source. In this case, the exclusive ownership rules can be characterized as relaxed in order to support the XCOPY operation. As a variation rather than relax the exclusive ownership rules, messages can be exchanged between the two nodes where the messages can include node A (which services the XCOPY operation) requesting that node B performs any needed reading of content or otherwise can use its mapping information of odd MD pages to return the address of such content to node B.

What will now be described are flowcharts of processing steps which can be performed in at least one embodiment in accordance with the techniques of the present disclosure.

Figure 10:
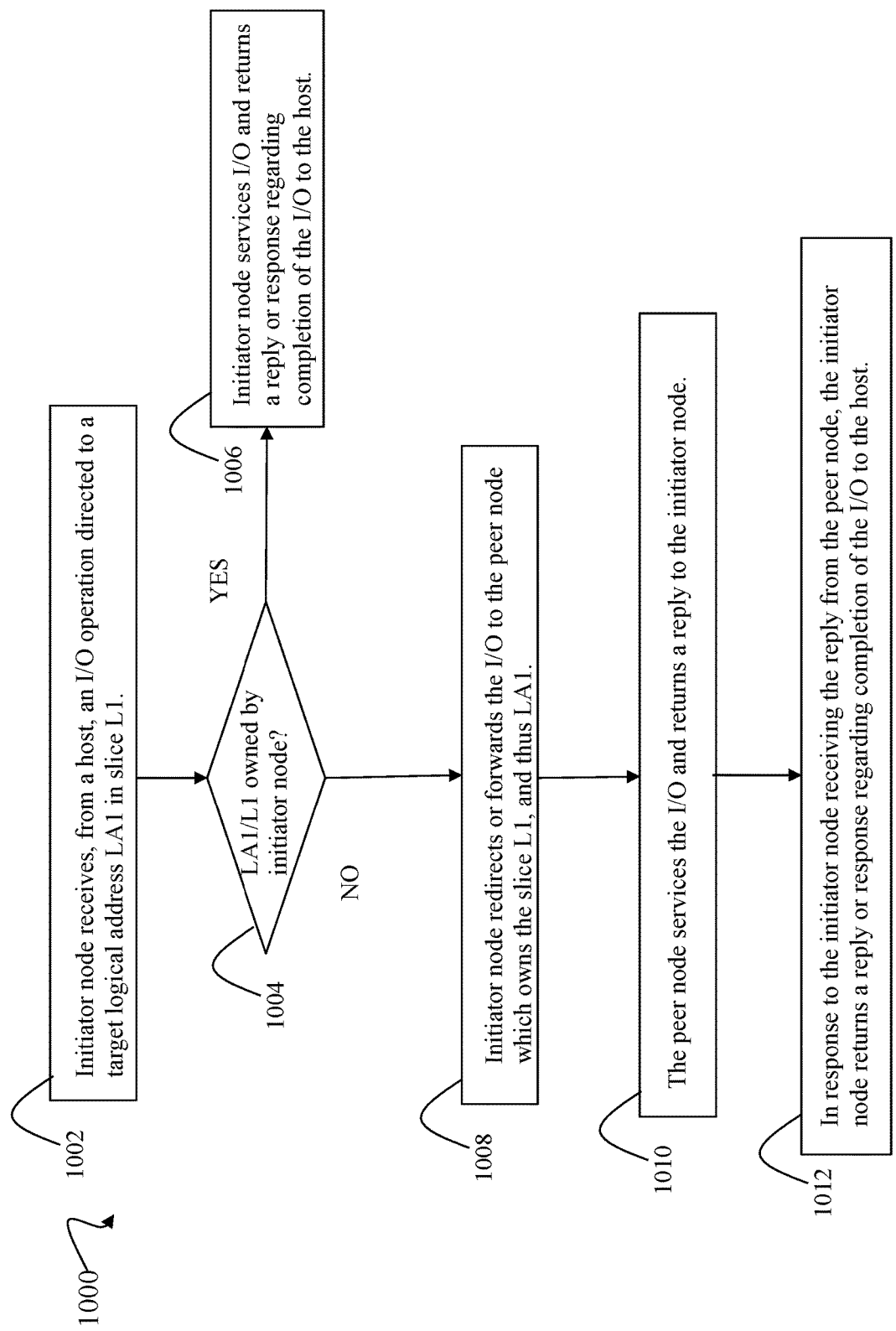
FIGS. 10, 11, 12, 13 and 14 are flowcharts of processing steps that can be performed in at least one embodiment in accordance with the techniques of the present disclosure.

Referring to FIG. 10, shown is a first flowchart 1000 of processing steps that can be performed in at least one embodiment in accordance with the techniques of the present disclosure.

At the step 1002, a initiator node receives a read I/O request from a host. The read I/O requests to read content C1 from the logical address LA1 of the logical address portion or slice L1, From the step 1002, control proceeds to the step 1004.

At the step 1004, the initiator node determines whether it owns the slice L1, and thus owns LA1. If the step 1004 evaluates to yes, control proceeds to the step 1006.

At the step 1006, the initiator node services the I/O and returns a reply or response regarding completion of the I/O to the host.

If the step 1004 evaluates to no, it means that the peer node owns L1 and thus owns LA1. If the step 1004 evaluates no, control proceeds to the step 1008.

At the step 1008, the initiator node redirects or forwards the I/O to the peer node which owns the slice L1 and thus owns LA1. From the step 1008, control proceeds to the step 1010.

At the step 1010, the peer node services the I/O and returns a reply to the initiator node. From the step 1010, control proceeds to the step 1012.

At the step 1012, in response to the initiator node receiving the reply from the peer node, the initiator node returns a reply or response regarding completion of the I/O to the host.

Figure 11:
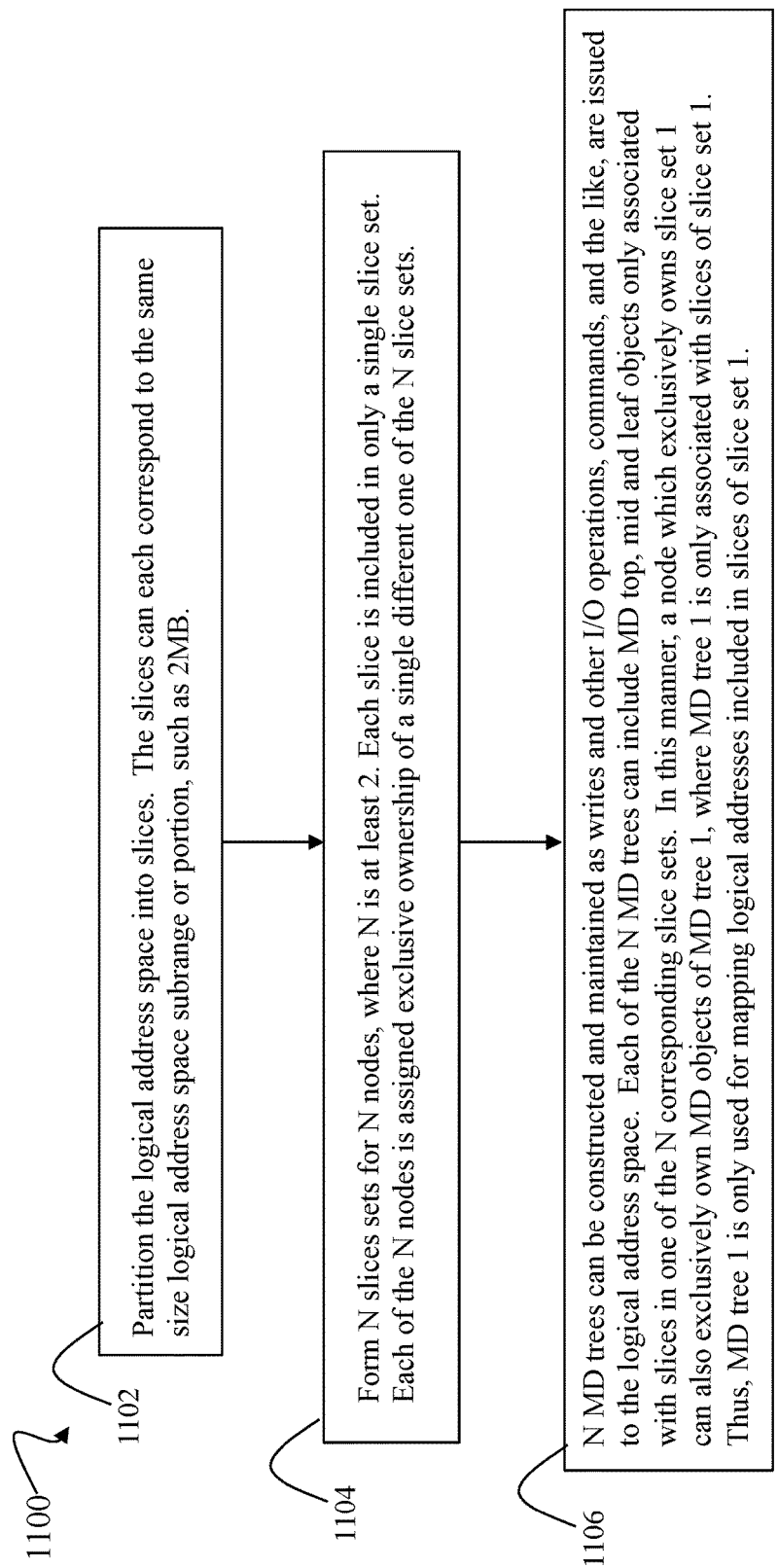

Referring to FIG. 11, shown is a second flowchart 1100 of processing steps that can be performed in at least one embodiment in accordance with the techniques of the present disclosure.

At the step 1102, processing can be performed to partition the logical address space into slices. The slices can each correspond to the same size logical address space subrange or portion, such as 2 MB. From the step 1102, control proceeds to the step 1104.

At the step 1104, N slice sets can be formed for the N nodes. N can be at least 2. Each slice is included in only a single one of the N slice sets. Each of the N nodes can be assigned exclusive ownership of a single different one of the N slice sets. From the step 1104, control proceeds to the step 1106.

At the step 1106, N MD trees can be constructed and maintained as writes and other I/O operations, commands, and the like, are issued to the logical address space. Each of the N MD trees can include MD top, mid and leaf objects only associated with slices in one of the N corresponding slice sets. In this manner, a node which exclusively owns slice set 1 can also exclusively own MD objects of MD tree 1, where MD tree 1 is only associated with slices of slice set 1. Thus, MD tree 1 is only used for mapping logical addresses included in slices of slice set 1. In at least one embodiment where N=2 nodes, there can be 2 MD trees—an even MD tree and an odd MD tree as described elsewhere herein. In such an embodiment with 2 nodes, there can also be 2 slices sets—an even slice set and an odd slice set as described elsewhere herein.

Figure 12:
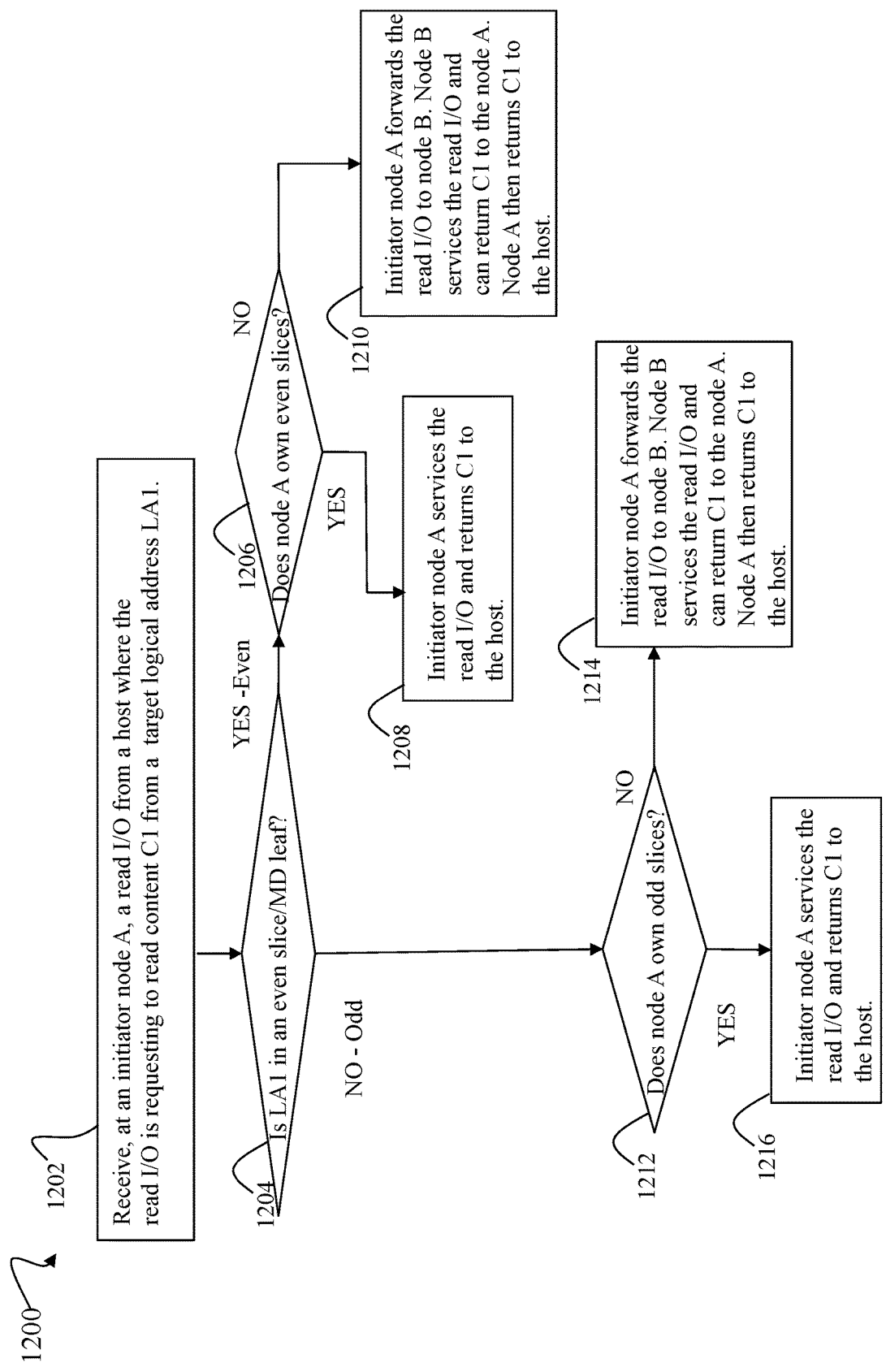

Referring to FIG. 12, shown is a third flowchart 1200 of processing steps that can be performed in at least one embodiment in accordance with the techniques of the present disclosure. The flowchart 1200 includes processing steps that can be performed in connection with read I/O processing.

At the step 1202, an initiator node A can receive a read I/O from a host. The read I/O can request to read content C1 from a target logical address LA1. From the step 1202, control proceeds to the step 1204.

At the step 1204, initiator node A can determine whether LA1 is in an even slice or associated with an even MD leaf. If the step 1204 evaluates to yes, control proceeds to the step 1206.

At the step 1206, a determination can be made by node A as to whether node A owns even slices. If the step 1206 evaluates to yes, control proceeds to the step 1208.

At the step 1208, the owning initiator node A, which owns even slices, services the read I/O and returns C1 to the host. Servicing the read I/O can include using the MD objects or pages of mapping information for LA1. Such mapping information can include MD top, mid and leaf objects of the even MD tree which map LA1 to a corresponding physical location PA1 on BE non-volatile storage where PA1 contains C1. In at least one embodiment, the owning node A can implement a volatile memory cache of content stored at various logical addresses. In such an embodiment, node A can determine whether the content C1 for LA1 is stored in its node local cache (e.g., cache hit). If so, node A can retrieve C1 from its cache and return it to the host. Otherwise the node A can retrieve C1 from another source. In at least one embodiment in which writes are recorded in a log, it can be possible that the log includes the content C1 for LA1. If so, node A can retrieve C1 from the log and return C1 to the host. In at least one embodiment where there is a cache miss on node A and/or where the log does not include the requested read content stored at LA1, node A can read C1 from PA1 on the BE non-volatile storage, and return C1 to the host. Reading C1 from PA1 can include using the mapping information including the chain of MD top, mid and leaf objects used in mapping LA1 to PA1.

If the step 1206 evaluates to no, control can proceed to the step 1210. At the step 1210, node A forwards the read I/O to node B. Node B services the read I/O and can return C1 to node A. Node A then returns C1 to the host. As a variation, node B can return PA1 to node A where node A can then read C1 from PA1 as stored on the BE non-volatile storage. Consistent with other discussion herein the owning node B in the step 1210 can use the MD objects or pages or mapping information for LA1 to either return PA1 or C1 to the node A.

If the step 1204 evaluates to no, LA1 is an odd slide or odd MD leaf and control proceeds to the step 1212. At the step 1212, a determination is made by node A as to whether node A owns the odd slices. If the step 1212 evaluates to no, control proceeds to the step 1214. At the step 1214, the Initiator node A forwards the read I/O to the node B. Node B, which owns odd slices, services the read I/O and can return C1 to the node A. Node A then returns C1 to the host. Alternatively, node B can return PA1 to node A where node A can use PA1 to retrieve C1 from the BE non-volatile storage. Consistent with other discussion herein the owning node B can use the MD objects or pages or mapping information for LA1 to either return PA1 or C1 to the node A.

If the step 1212 evaluates to yes, control proceeds to the step 1216. At the step 1216, the initiator node A services the read I/O and returns C1 to the host.

Generally, processing of the steps 1208 and 1210 can be performed by the owning node using the even MD tree, where the owning node exclusively owns the even MD tree and even slices. Processing of the steps 1214 and 1216 can be performed by the owning node using the odd MD tree, where the owning node exclusively owns the odd MD tree and odd slices.

Figure 13:
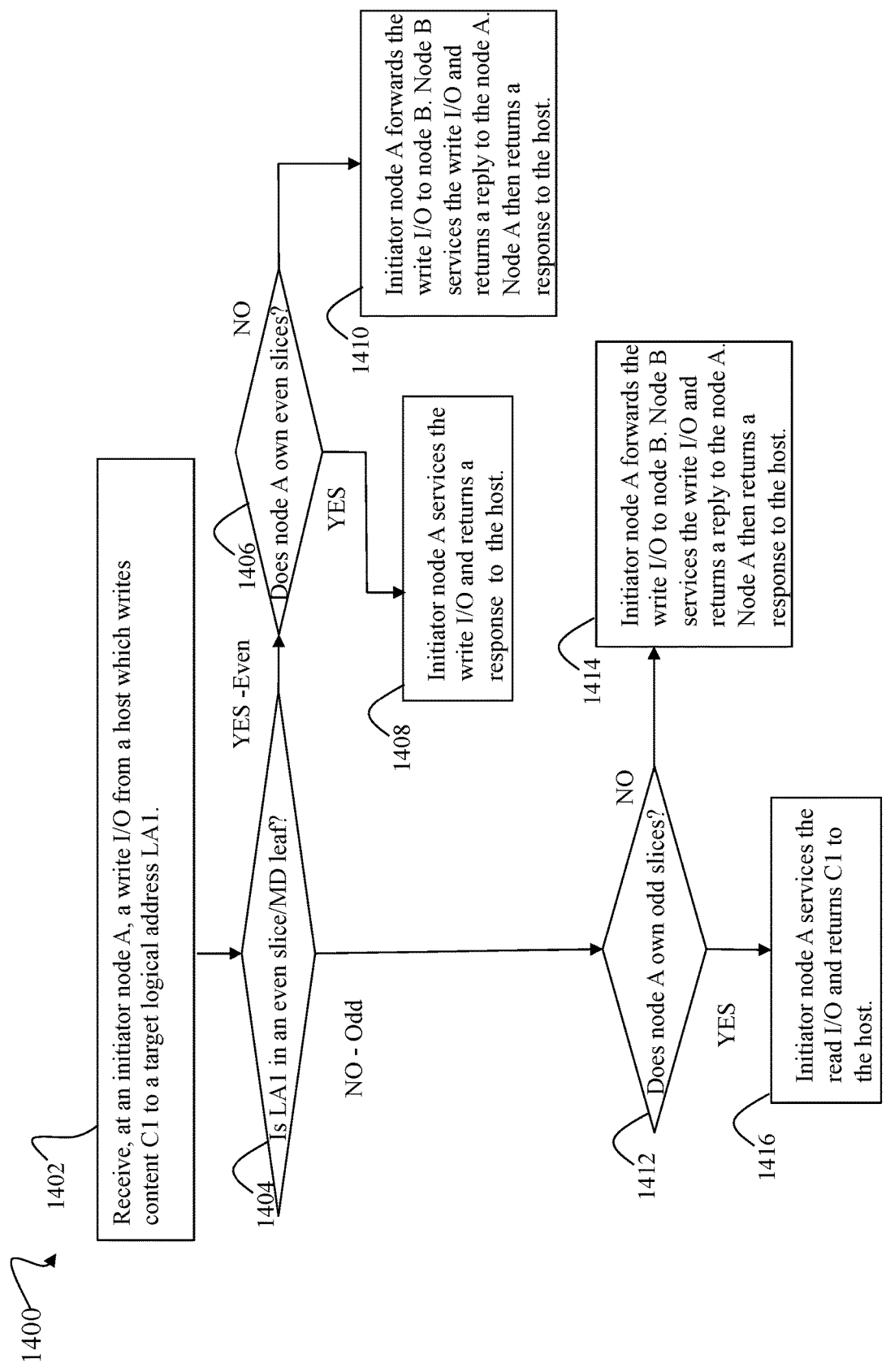

Referring to FIG. 13, shown is a fourth flowchart 1400 of processing steps that can be performed in at least one embodiment in accordance with the techniques of the present disclosure. The flowchart 1400 can be performed in connection with servicing a write I/O in a log based system where writes can be recorded in a log, and subsequently flushed from the log and destaged to BE non-volatile storage. Thus servicing a write can include recorded the write in the log.

At the step 1402, a write I/O can be received at an initiator node A from a host. The write I/O can write content C1 to a target logical address LA1. From the step 1402, control proceeds to the step 1404.

At the step 1404, a determination is by node A as to whether LA1 is included in an even slice or even MD leaf. If the step 1404 evaluates to yes, LA1 is included in an even slice and control proceeds to the step 1406. At the step 1406, a determination is made by node A as to whether node A owns the even slices. If the step 1406 evaluates to yes, control proceeds to the step 1408. At the step 1408, initiator A services the write and returns a response to the host. If the step 1406 evaluates to no, control proceeds to the step 1410. At the step 1410, the initiator node A forwards the write I/O to node B. Node B services the write I/O and returns a reply to the node A. Node A then returns a response to the host.

If the step 1404 evaluates to no, LA1 is included in an odd slice and control proceeds to the step 1412. At the step 1412, a determination is made by node A as to whether node A owns the odd slices. If the step 1412 evaluates to yes, control proceeds to the step 1416. At the step 1416, initiator A services the write and returns a response to the host. If the step 1412 evaluates to no, control proceeds to the step 1414. At the step 1414, the initiator node A forwards the write I/O to node B. Node B services the write I/O and returns a reply to the node A. Node A then returns a response to the host.

Figure 14:
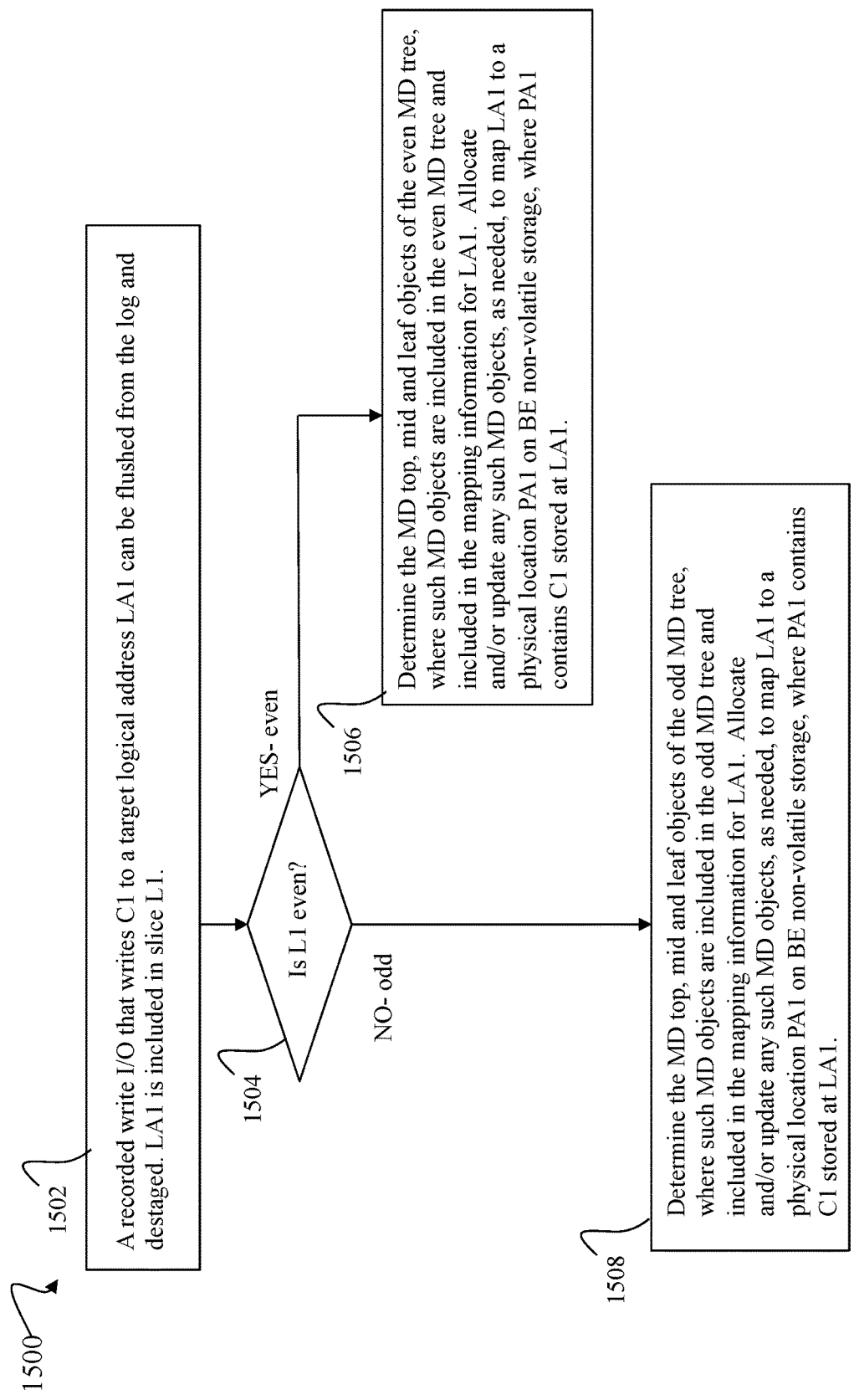

Referring to FIG. 14, shown is a fifth flowchart 1500 of processing steps that can be performed in at least one embodiment in accordance with the techniques of the present disclosure. The flowchart 1500 processing can be performed in connection with flushing and destaging a recorded write I/O from the log where the written content is stored to a physical location or address PA1 on BE non-volatile storage. In at least one embodiment, a recorded write I/O of the log which writes to a target logical address LA1 can be flushed and destaged by the node which exclusively owns LA1. In this manner, the owning node can also allocate and needed MD objects of the mapping information used for mapping LA1 to PA1.

At the step 1502, a recorded write I/O that writes C1 to a target logical address LA1 can be flushed from the log and destaged. LA1 is included in slice L1. From the step 1502, control proceeds to the step 1504.

At the step 1504, a determination can be made as to whether L1 is an even slice. If the step 1504 evaluates to yes, L1 which includes LA1 is an even slice and the even MD tree can be utilized. From the step 1504, control proceeds to the step 1506. At the step 1506, processing can determine the MD top, mid and leaf objects of the even MD tree, where such MD objects are included in the even MD tree and included in the mapping information for LA1. The step 1506 can include allocating and/or updating any such MD objects, as needed, to map LA1 to a physical location PA1 on BE non-volatile storage, where PA1 contains C1 stored at LA1.

If the step 1504 evaluates to no, L1 which include sLA1 is an odd slice and the odd MD tree can be utilized. From the step 1504, control proceeds to the step 1508. At the step 1508, processing can determine the MD top, mid and leaf objects of the odd MD tree, where such MD objects are included in the odd MD tree and included in the mapping information for LA1. Processing of the step 1506 can include allocating and/or updating any such MD objects, as needed, to map LA1 to a physical location PA1 on BE non-volatile storage, where PA1 contains C1 stored at LA1.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   partitioning a logical address space into a plurality of slices where each of the plurality of slices corresponds to one of a first plurality of logical address subranges of the logical address space;
   forming a plurality of sets, wherein each of the plurality of sets includes a portion of the plurality of slices and includes corresponding metadata objects associated with the portion of slices included in said each set;
   assigning the plurality of sets to a plurality of nodes of a storage system, where each of the plurality of nodes is assigned a single one of the plurality of sets, wherein said each node exclusively owns slices and corresponding metadata objects of said single set assigned to said each node, and wherein said each node exclusively owns logical addresses of slices included in said single set assigned to said one node;
   receiving, from a host at a first of the plurality of nodes of the storage system, an I/O operation directed to a target logical address;
   determining whether the first node or a second of the plurality of nodes exclusively owns a first slice including the target logical address;
   responsive to determining the first node exclusively owns the first slice including the target logical address, the first node performing first processing to service the I/O operation; and
   responsive to determining that the second node owns the first slice including the target logical address, the first node performing second processing including:
     forwarding the I/O operation to the second node for servicing;
     receiving, at the first node from the second node, a reply regarding said forwarding; and
     responsive to receiving the response, the first node sending a second reply to the host regarding the I/O operation.

2. The computer-implemented method of claim 1, wherein the first node exclusively owns first slices and exclusively owns corresponding first metadata objects in a first of the plurality of sets, and wherein the second node exclusively owns second slices and exclusively owns corresponding second metadata objects in a second of the plurality of sets.

3. The computer-implemented method of claim 2, wherein the first set includes the first slices corresponding to first metadata leaf objects, wherein the first set includes first metadata mid objects which point to or reference the first metadata leaf objects, and wherein the first set includes first metadata top objects which reference or point to the first metadata mid objects; and wherein the second set includes the second slices corresponding to second metadata leaf objects, wherein the second set includes second metadata mid objects which point to or reference the second metadata leaf objects, and wherein the first set includes second metadata top objects which reference or point to the second metadata mid objects.

4. The computer-implemented method of claim 3, wherein the first metadata leaf objects, the first metadata mid objects, and the first metadata top objects are used to map first logical addresses associated with the first slices to corresponding first physical storage locations including content stored at the first logical addresses; and wherein the second metadata leaf objects, the second metadata mid objects, and the second metadata top objects are used to map second logical addresses associated with the second slices to corresponding second physical storage locations including content stored at the second logical addresses.

5. The computer-implemented method of claim 2, wherein only the first node services I/Os directed to target logical addresses in the first slices exclusively owned by the first node; and wherein only the second node services I/O directed to target logical addresses in the second slices exclusively owned by the second node.

6. The computer-implemented method of claim 5, wherein the I/O operation is a read I/O operation requesting to read content C1 from the target logical address, wherein the first node owns the target logical address and the first slice including the target logical address, and wherein the first metadata objects owned by the first node include a metadata top object, a metadata mid object and a metadata leaf object each of which are associated with the target logical address and each of which are exclusively owned by the first node.

7. The computer-implemented method of claim 6, wherein first mapping information is used in mapping the target logical address to a first storage location storing C1, and wherein the first mapping information includes the metadata top object, the metadata mid object and the metadata leaf object associated with the target logical address.

8. The computer-implemented method of claim 5, wherein the I/O operation is a read I/O operation requesting to read content C1 from the target logical address, wherein the second node owns the target logical address and the first slice including the target logical address, and wherein the second metadata objects owned by the second node include a metadata top object, a metadata mid object and a metadata leaf object each of which are associated with the target logical address and each of which are exclusively owned by the second node.

9. The computer-implemented method of claim 8, wherein first mapping information is used in mapping the target logical address to a first storage location storing C1, and wherein the first mapping information includes the metadata top object, the metadata mid object and the metadata leaf object associated with the target logical address.

10. The computer-implemented method of claim 2, wherein the plurality of node is two nodes, the first node and the second node.

11. The computer-implemented method of claim 10, further comprising:
assigning a slice identifier (ID) to each of the plurality of slices, said slice ID uniquely identifying said each slice with respect to other of the plurality of slices, where each slice ID assigned to a corresponding one of the plurality of slices is an integer included in a sequence of consecutive increasing integers;
forming a first slice set including only the first slices, where the first slices only include ones of the plurality of slices having an odd slice ID; and
forming a second slice set including only the second slices, where the second slices only include ones of the plurality of slices having an even slice ID.

12. The computer-implemented method of claim 11, wherein slices of the first slice set are interleaved with slices of the second slice set in the logical address space.

13. The computer-implemented method of claim 12, wherein the first plurality of logical address subranges of the logical address space are consecutive contiguous subranges of logical addresses.

14. The computer-implemented method of claim 13, wherein the slice IDs assigned to the plurality of slices denote a position of the plurality of slices in the logical address space.

15. The computer-implemented method of claim 11, wherein an odd metadata hierarchical structure includes the first metadata objects and the odd metadata hierarchical structure is exclusively owned by the first node, and wherein an even metadata hierarchical structure includes the second metadata objects and the even metadata hierarchical structure is exclusively owned by the second node.

16. The computer-implemented method of claim 15, wherein the first node uses the odd metadata hierarchical structure to map first logical addresses associated with the first slice set to corresponding physical storage locations including content stored at the first logical addresses, and wherein the second node uses the even metadata hierarchical structure to map second logical addresses associated with the second slice set to corresponding physical storage locations including content stored at the second logical addresses.

17. The computer-implemented method of claim 16, further comprising:
receiving a write I/O that writes content C1 to a second target logical address LA2, wherein LA2 is included in a target slice of the first slice set owned by the first node;
recording the write I/O in a log;
destaging, by the first node, the recorded write I/O from the log, wherein said destaging includes:
updating second mapping information to map LA2 to a second physical storage location PA2 including C1, wherein the second mapping information includes a second plurality of metadata objects of the odd metadata hierarchical structure owned exclusively by the first node.

18. The computer-implemented method of claim 17, wherein said destaging includes:
allocating one or more of the second plurality of metadata objects used to map LA2 to PA2.

19. A non-transitory computer readable medium comprising code stored thereon that, when executed, performs a method comprising:
- partitioning a logical address space into a plurality of slices where each of the plurality of slices corresponds to one of a first plurality of logical address subranges of the logical address space;
- forming a plurality of sets, wherein each of the plurality of sets includes a portion of the plurality of slices and includes corresponding metadata objects associated with the portion of slices included in said each set;
- assigning the plurality of sets to a plurality of nodes of a storage system, where each of the plurality of nodes is assigned a single one of the plurality of sets, wherein said each node exclusively owns slices and corresponding metadata objects of said single set assigned to said each node, and wherein said each node exclusively owns logical addresses of slices included in said single set assigned to said one node;
- receiving, from a host at a first of the plurality of nodes of the storage system, an I/O operation directed to a target logical address;
- determining whether the first node or a second of the plurality of nodes exclusively owns a first slice including the target logical address;
- responsive to determining the first node exclusively owns the first slice including the target logical address, the first node performing first processing to service the I/O operation; and
- responsive to determining that the second node owns the first slice including the target logical address, the first node performing second processing including:
  - forwarding the I/O operation to the second node for servicing;
  - receiving, at the first node from the second node, a reply regarding said forwarding; and
  - responsive to receiving the response, the first node sending a second reply to the host regarding the I/O operation.

20. A system comprising:
- one or more processors; and
- a memory comprising code stored thereon that, when executed, performs a method comprising:
  - partitioning a logical address space into a plurality of slices where each of the plurality of slices corresponds to one of a first plurality of logical address subranges of the logical address space;
  - forming a plurality of sets, wherein each of the plurality of sets includes a portion of the plurality of slices and includes corresponding metadata objects associated with the portion of slices included in said each set;
  - assigning the plurality of sets to a plurality of nodes of a storage system, where each of the plurality of nodes is assigned a single one of the plurality of sets, wherein said each node exclusively owns slices and corresponding metadata objects of said single set assigned to said each node, and wherein said each node exclusively owns logical addresses of slices included in said single set assigned to said one node;
  - receiving, from a host at a first of the plurality of nodes of the storage system, an I/O operation directed to a target logical address;
  - determining whether the first node or a second of the plurality of nodes exclusively owns a first slice including the target logical address;
  - responsive to determining the first node exclusively owns the first slice including the target logical address, the first node performing first processing to service the I/O operation; and
  - responsive to determining that the second node owns the first slice including the target logical address, the first node performing second processing including:
    - forwarding the I/O operation to the second node for servicing;
    - receiving, at the first node from the second node, a reply regarding said forwarding; and
    - responsive to receiving the response, the first node sending a second reply to the host regarding the I/O operation.

\* \* \* \* \*